US008749672B2

(12) United States Patent
Komiya et al.

(10) Patent No.: US 8,749,672 B2
(45) Date of Patent: Jun. 10, 2014

(54) DIGITAL CAMERA HAVING A MULTI-SPECTRAL IMAGING DEVICE

(75) Inventors: Yasuhiro Komiya, Hino (JP); Nobuyuki Watanabe, Yokohama (JP)

(73) Assignee: Olympus Corporation (JP)

( * ) Notice: Subject to any disclaimer, the term of this patent is extended or adjusted under 35 U.S.C. 154(b) by 327 days.

(21) Appl. No.: 13/193,778

(22) Filed: Jul. 29, 2011

(65) Prior Publication Data

US 2012/0044394 A1    Feb. 23, 2012

(30) Foreign Application Priority Data

Aug. 20, 2010  (JP) ................. 2010-184976

(51) Int. Cl.
*H04N 9/083*  (2006.01)
*H04N 9/07*  (2006.01)
*H04N 5/222*  (2006.01)
*H04N 5/235*  (2006.01)

(52) U.S. Cl.
USPC ........ 348/271; 348/278; 348/266; 348/230.1; 348/333.01

(58) Field of Classification Search
USPC .............. 348/271–273, 278–279, 266, 222.1, 348/220.1, 333.01, 230.1
See application file for complete search history.

(56) References Cited

U.S. PATENT DOCUMENTS

| 6,275,261 | B1 * | 8/2001 | Yamazaki | 348/273 |
| 6,593,964 | B1 * | 7/2003 | Sakurai | 348/279 |
| 8,134,618 | B2 * | 3/2012 | Ajito et al. | 348/278 |
| 2007/0013796 | A1 | 1/2007 | Ueno et al. | |
| 2007/0216785 | A1 | 9/2007 | Nomura et al. | |
| 2010/0194958 | A1 | 8/2010 | Honda et al. | |
| 2011/0032395 | A1 * | 2/2011 | Kido et al. | 348/272 |

FOREIGN PATENT DOCUMENTS

| JP | 11-220740 A | 8/1999 |
| JP | 2002-135792 | 5/2002 |
| JP | 2003-087806 | 3/2003 |
| JP | 2005-151549 | 6/2005 |
| JP | 2007-251393 A | 9/2007 |
| JP | 2010-183195 A | 8/2010 |

OTHER PUBLICATIONS

Office Action issued in corresponding Japanese Application No. 2010-184976 dated Feb. 4, 2014 (3 pp.).

* cited by examiner

*Primary Examiner* — Nhan T Tran
(74) *Attorney, Agent, or Firm* — Volpe and Koenig, P.C.

(57) ABSTRACT

A multi-spectral imaging device includes pixels R, G, B, $\lambda 1$, $\lambda 2, \ldots, \lambda 12$ composing color sensors for four or more colors having mutually differing spectral sensitivity characteristics. In a first signal readout mode, an image signal including all of four or more types of signals read from the pixels composing the color sensors for the four or more colors is read from the multi-spectral imaging device. In a second signal readout mode, an image signal having a smaller number of colors than that of the first signal readout mode is read such that a narrower gamut than a gamut that can be reproduced by the image signal read in the first signal readout mode is formed.

12 Claims, 13 Drawing Sheets

DIGITAL CAMERA HAVING A MULTI-SPECTRAL IMAGING DEVICE

FIELD OF THE INVENTION

This invention relates to a digital camera including an imaging device (a multi-spectral sensor) carrying color sensors for four or more colors.

DESCRIPTION OF THE RELATED ART

Imaging devices having larger pixel counts are coming into use in digital cameras, and imaging devices having a pixel count exceeding 10 million may be used not only in single lens reflex cameras but also in so-called compact digital cameras and cameras built into portable telephones. In accordance with this increase in the pixel count of an imaging device, usage methods for improving a color reproduction performance by increasing a number of colors in image pickup have been proposed in recent years in addition to methods for increasing a resolution (a pixel size of an image). More specifically, color sensors for three colors, namely R, G, B, are used in a conventional digital camera, but by using color sensors for four or more colors so that the number of colors during image pickup is increased, color components of an object can be detected more accurately and a reproducible gamut can be enlarged, leading to an improvement in the color reproduction performance.

JP2003-87806A, JP2005-151549A, and JP2002-135792A disclose devices using this type of multi-spectral sensor. JP2003-87806A discloses an example that uses a 16-color color filter having a narrow band characteristic. JP2005-151549A discloses an example that uses, in addition to RGB filters, a filter having a spectral transmission characteristic in which a center wavelength is slightly shorter or slightly longer than the color G. JP2002-135792A discloses an example that uses a gray color filter in addition to RGB filters.

SUMMARY OF THE INVENTION

Many digital cameras have a live view display function. In live view display, an image signal read from the imaging device at a frame rate of 30 fps, for example, is processed such that an image is displayed on a monitor display device provided on a back surface or the like of the camera or an inbuilt or external electronic viewfinder (EVF).

During live view display, the display is updated at a comparatively high frame rate, and therefore the view of an image pickup lens can be displayed substantially in real time. Hence, a user can look at the live view image and determine a composition by adjusting an orientation of the camera or a focal length of the image pickup lens, check an exposure and adjust a focus (or check a focus adjustment condition), and so on. Thus the display is updated at a comparatively high frame rate in this manner, whereas a display pixel count (display resolution) is reduced in comparison with a recording image pixel count, and the display resolution falls approximately between QVGA and SVGA or the like.

The imaging device itself has an effective pixel count that far more exceeds SVGA, for example a pixel count exceeding 10 million pixels, as noted above. Accordingly, when so-called all pixel readout is performed, an information amount of the image signal read from the imaging device increases dramatically, making it difficult to read image signals at a high frame rate. Alternatively, to ensure that the image signals can be read, processed, and displayed at a high frame rate, a more complicated circuit configuration and a more advanced processing ability are required, leading to a reduction in the life of a battery and an increase in the manufacturing costs of the camera.

For these reasons, all pixel readout is not performed during image display, and instead, a technique such as skip readout, pixel addition readout, or area readout is employed to reduce a readout information amount when an image signal is read from the imaging device.

In one aspect of the invention, a digital camera comprising a multi-spectral imaging device which includes pixels that form color sensors for four or more colors having mutually differing spectral sensitivity characteristics, and which is capable of operating in either a first signal readout mode in which an image signal including a first information amount is read in a first signal readout time or a second signal readout mode in which an image signal including a second information amount that is smaller than the first information amount is read in a second signal readout time that is shorter than the first signal readout time, wherein the multi-spectral imaging device is configured to be capable of outputting image signals in a number of colors corresponding to all of the four or more colors read from the pixels composing the color sensors for the four or more colors in the first signal readout mode, and outputting image signals in a smaller number of colors in the second signal readout mode than in the first signal readout mode to form a narrower gamut than a gamut that can be reproduced by the image signals output in the first signal readout mode.

BRIEF DESCRIPTION OF THE DRAWINGS

The present invention is described in detail below with reference to the following Figures.

FIG. 4A is a view illustrating an array of color filters disposed on a single plate imaging device provided in a digital camera according to a second embodiment of this invention, in which color filters in all colors are arranged.

FIG. 4B shows an array of R, G, and B color filters disposed on subject pixels from which image signals are to be read in a skip readout mode, from among the color filters arranged on the single plate imaging device provided in the digital camera according to the second embodiment of this invention.

FIG. 5A is a view illustrating an array of color filters disposed on a single plate imaging device provided in a digital camera according to a third embodiment of this invention, in which color filters in all colors are arranged.

FIG. 5B is a schematic view illustrating an array of color filters disposed on the single plate imaging device provided in the digital camera according to the third embodiment of this invention, in which image signals of each of R, G, and B are obtained equivalently when image signals are read in a pixel addition readout mode.

FIG. 14 is a schematic view showing an example of an array of color filters disposed on the imaging device shown in FIG. 11, in which, following the exposure operation in the global shutter mode, image signals are read from pixels on a line subjected to preferential readout, whereupon image signals are read from remaining lines not subjected to the preferential readout and exposure is performed in a rolling shutter mode.

DETAILED DESCRIPTION OF THE PREFERRED EMBODIMENTS

-First Embodiment-

Figure 1:
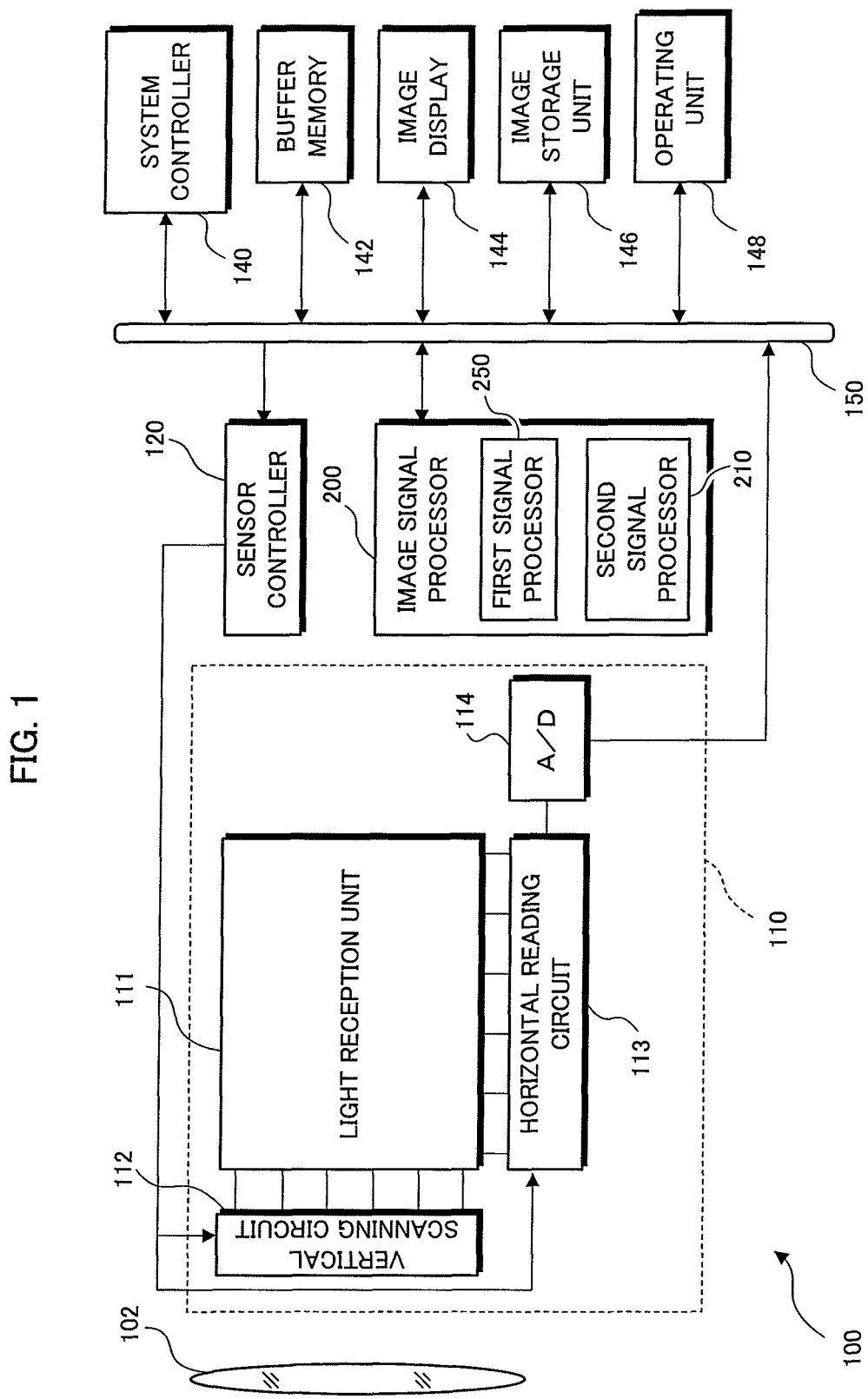
FIG. 1 is a schematic block diagram illustrating an internal constitution of a digital camera to which this invention is applied.

FIG. 1 is a block diagram illustrating the schematic constitution of a digital camera to which this invention is applied. In this embodiment of this invention, a digital camera 100 will be described as a digital still camera. Needless to say, this invention may also be applied to a digital movie camera or the like capable of photographing still images.

The digital camera 100 includes an image pickup lens 102, an imaging device 110, a sensor controller 120, an image signal processor 200, a system controller 140, a buffer memory 142, an image display 144, an image storage unit 146, an operating unit 148, and a system bus 150.

The imaging device 110, the sensor controller 120, the image signal processor 200, the system controller 140, the buffer memory 142, the image display 144, the image storage unit 146, and the operating unit 148 are electrically connected via the system bus 150.

The system controller 140 is constituted by a CPU or the like, and performs overall control of operations of the digital camera 100. The buffer memory 142 is constituted by an SDRAM or the like, and has a comparatively high access speed. The buffer memory 142 can be accessed from both the system controller 140 and the image signal processor 200. The buffer memory 142 is used as a work area when a digital image signal output by the imaging device 110 is processed by the image signal processor 200 to generate image data. The buffer memory 142 is also used as a work area when the system controller 140 executes a program for controlling the digital camera 100.

The image display 144 includes a color liquid crystal display element, a backlight device, and so on, and is formed to be capable of displaying an image obtained through image pickup by the digital camera 100, a live view image, an operating condition of the digital camera 100, and so on. The image display 144 may be provided on a back face, an upper face, or a side face of the digital camera 100. Further, the image display 144 may be an EVF (electronic viewfinder) constituted by a comparatively small display element and an enlarging optical system. Alternatively, the image display 144 may take a plurality of forms that can be selected by a user in accordance with usage conditions. The image display 144 may also include an organic EL display element or the like instead of a combination of a color liquid crystal display element and a backlight.

The image storage unit 146 is constituted by an inbuilt or external flash memory or the like, and is capable of storing image data files and so on generated during image pickup by the digital camera 100.

The operating unit 148 includes various switches, dials, and so on, and is capable of receiving an operation mode setting operation, a release operation for image pickup, and so on, performed by a user of the digital camera 100.

The image pickup lens 102 forms an object image on a light receiving surface of the imaging device 110. The image pickup lens 102 may be a fixed lens fixed to the digital camera 100 or an interchangeable lens that can be attached to and detached from the digital camera 100.

The imaging device 110 may be a CCD or CMOS image sensor. In this specification, the imaging device 110 will be described as a single plate CMOS image sensor. The imaging device 110 includes a light reception unit 111, a vertical scanning circuit 112, a horizontal reading circuit 113, and an A/D converter (denoted by A/D in FIG. 1) 114.

The light reception unit 111 includes a large number of pixels arranged two-dimensionally in a latitudinal direction (a horizontal direction) and a longitudinal direction (a vertical direction) in FIG. 1, and is capable of outputting a color image signal corresponding to the object image formed by the image pickup lens 102. An on-chip color filter in one of four or more colors is disposed on each pixel. The imaging device 110 constituted as described above is a multi-spectral imaging device including pixels that form color sensors for four or more colors having mutually differing spectral sensitivity characteristics. By performing demosaicing processing and so on, to be described below, on the image signal read from the imaging device 110, multi-spectral image data in four or more colors can be generated.

The vertical scanning circuit 112 is capable of specifying subject pixels, from among the pixels arranged two-dimensionally on the light reception unit 111 as described above, for which image signals are to be read, in row units (horizontal line units). The horizontal reading circuit 113 is capable of specifying subject pixels for which image signals are to be read successively from among the pixels on the row (the horizontal line) specified by the vertical scanning circuit 112, reading and amplifying the image signal output from the specified pixel, and outputting the amplified image signal to the A/D converter 114. The A/D converter 114 converts the analog image signal output from the horizontal reading circuit 113 into a digital image signal. The digital image signal is stored temporarily in the buffer memory 142.

The sensor controller 120 is capable of issuing a control signal to the vertical scanning circuit 112 and the horizontal reading circuit 113 on the basis of a command signal output from the system controller 140, thereby controlling the imaging device 110 such that a digital image signal is output from an arbitrary pixel.

Before describing an operation of the sensor controller 120, two image signal readout modes provided in the imaging device 110 will be described. The imaging device 110 is capable of reading image signals in a first signal readout mode and a second signal readout mode.

In the first signal readout mode, an image signal including all of the four or more colors that are output from the pixels constituting the aforesaid color sensors for four or more colors is output from the imaging device 100. It is assumed here that the output image signal has a first information amount and that a first readout time is required to read the image signal. The first signal readout mode may be referred to as an all pixel readout mode.

In the second signal readout mode, an image signal including a smaller number of colors than the image signal output in the first signal readout mode but including at least colors corresponding to the three primary colors R (red), G (green), and B (blue) is output from the imaging device 110. Here, the output image signal has a second information amount, which is smaller than the first information amount of the first signal readout mode. Further, a gamut that can be reproduced by the image signal read in the second signal readout mode is narrower than the gamut that can be reproduced by the image signal read in the first signal readout mode.

Furthermore, image signal readout in the second signal readout mode can be completed in a second readout time, which is shorter than the first readout time required in the first signal readout mode. In the second signal readout mode, skip readout, pixel addition readout, or a combination of the two may be employed, depending on the specifications of the employed imaging device 110. The image signals output in the first signal readout mode and the second signal readout mode will be described in detail below.

The digital camera 100 is capable of displaying a live view image on the image display 144 when the user points the digital camera 100 toward an object in order to determine a composition and check a focus adjustment condition. At this time, images are preferably displayed on the image display 144 at a frame rate of 15 fps, 30 fps, or higher. In this case, image signals are read from the imaging device 100 in the second signal readout mode.

The system controller 140 determines which of the first signal readout mode and the second signal readout mode is to be used to read image signals from the imaging device 100 in accordance with an operating condition of the digital camera 100, and outputs a control signal corresponding to the determined signal readout mode to the sensor controller 120 and the image signal processor 200.

The sensor controller 120 outputs a control signal to the vertical scanning circuit 112 and the horizontal reading circuit 113 on the basis of the control signal output from the system controller 140 so that an image signal is read from the imaging device 100 in either the first signal readout mode or the second signal readout mode.

The image signal processor 200 includes a first signal processor 250 and a second signal processor 210. The first signal processor 250 processes the digital image signal read from the imaging device 110 in the first signal readout mode and stored temporarily in the buffer memory 142 to generate multi-spectral image data or RGB image data.

The second signal processor 210 processes the digital image signal read from the imaging device 110 in the second signal readout mode and stored temporarily in the buffer memory 142 to generate image data for displaying a live view image on the image display 144 or image data to be recorded as moving image data in the image storage unit 146. It is assumed in the following description that the second signal processor 210 generates live view display image data by processing an RGB three-color digital image signal.

Figure 2:
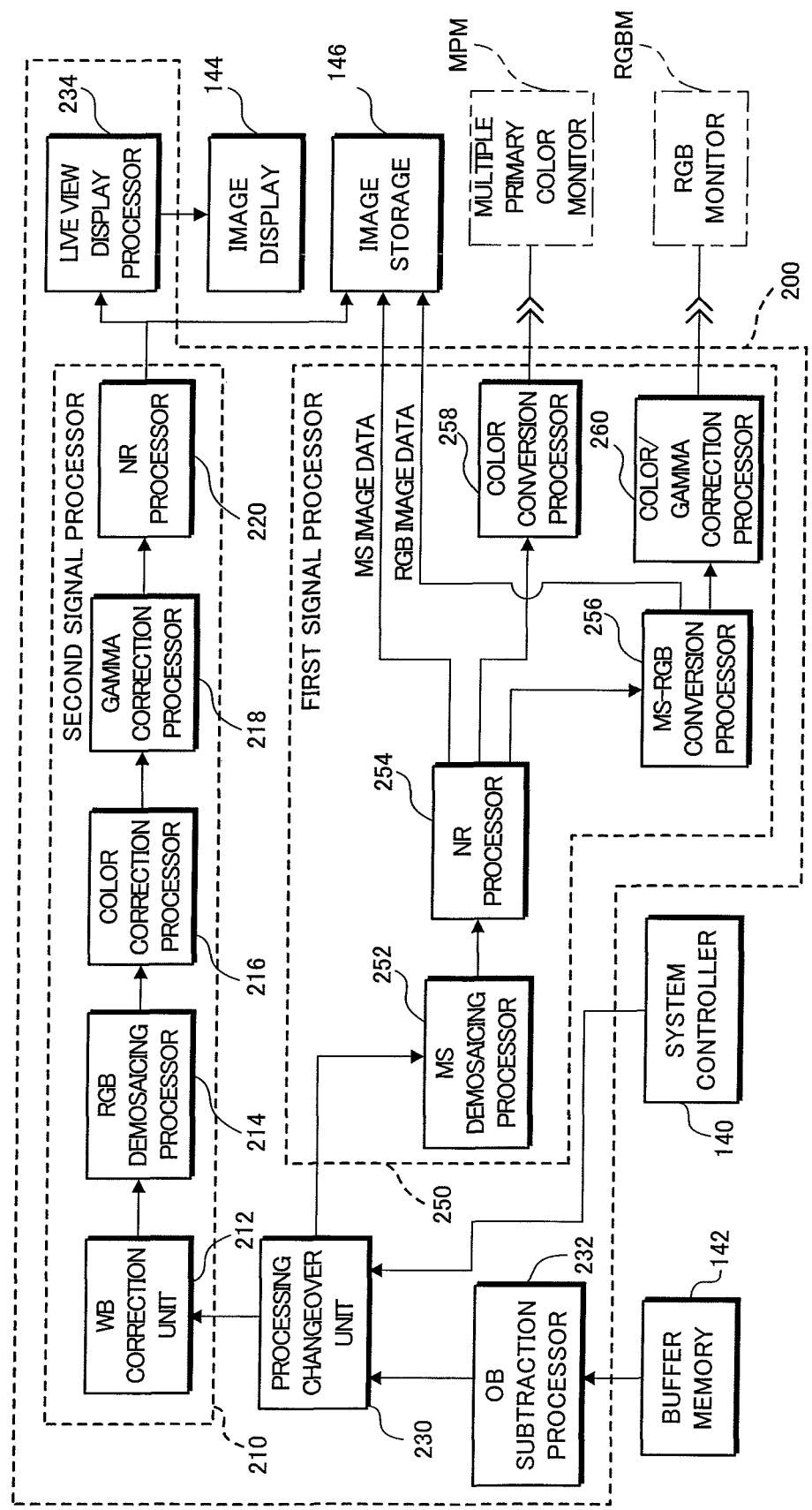
FIG. 2 is a schematic block diagram illustrating an internal constitution of an image signal processor.

FIG. 2 is a block diagram showing the constitution of the image signal processor 200 in further detail. The image signal processor 200 includes, in addition to the first signal processor 250 and the second signal processor 210 described above, an OB subtraction processor 232, a processing changeover unit 230, and a live view display processor 234.

The OB subtraction processor 232 performs OB subtraction processing (processing for canceling a dark current component of the image signal read from the imaging device 110) on the digital image signal stored temporarily in the buffer memory 142. On the basis of the control signal output from the system controller 140, the processing changeover unit 230 switches between the processing performed by the first signal processor 250 and the processing performed by the second signal processor 210 as the processing to be performed on the digital image signal subjected to the OB subtraction processing by the OB subtraction processor 232 and stored temporarily in the buffer memory 142.

The first signal processor 250 includes an MS demosaicing processor 252, an NR processor 254, an MS-RGB conversion processor 256, a color conversion processor 258, and a color/gamma correction processor 260.

The MS demosaicing processor 252 performs demosaicing processing on the multi-spectral digital image signal stored temporarily in the buffer memory 142. The MS demosaicing processor 252 then generates image data including pixel values for the four or more colors in relation to each pixel on the basis of the image signal including all of the four or more colors read from the imaging device 110 in the first signal readout mode. In other words, multi-spectral image data constituted by four or more color plains are generated.

The NR processor 254 performs noise reduction processing on the multi-spectral image data generated by the MS demosaicing processor 252 through coring processing, median filter processing, and so on.

When the digital camera 100 is set in a mode for recording multi-spectral image data, the multi-spectral image data (denoted by MS image data in FIG. 2) processed by the NR processor 254 and stored temporarily in the buffer memory 142 are subjected to compression processing if necessary and then recorded in the image storage unit 146 as a multi-spectral image data file generated in accordance with a predetermined format. At this time, color reproduction information is attached to the multi-spectral image data file as tag information to be referenced when image reproduction processing is performed subsequently. The color reproduction information may include a spectral transmittance of the image pickup lens 102, a spectral sensitivity of the imaging device 110, a spectral radiance of light (an image pickup illuminant) illuminating the object during image pickup, and statistical information unique to the object that is referenced in a process of estimating a spectral reflectivity of the object, and so on.

Further, when a multiple primary color monitor MPM is connected to the digital camera 100, and the operating mode of the digital camera 100 is set at an image reproduction mode, the color conversion processor 258 performs color conversion processing on the multi-spectral image data processed by the NR processor 254. The color conversion processor 258 obtains information (monitor profile information) relating to a monitor profile of the multiple primary color monitor MPM and so on in advance. The color conversion processor 258 also obtains information (observing illumination spectrum information) relating to the spectral radiance of a illuminant illuminating an environment in which the multiple primary color monitor MPM is set from a sensor disposed in the vicinity of the multiple primary color monitor MPM. The color conversion processor 258 then performs color conversion processing on the basis of the monitor profile information and the observing illumination spectrum information, and outputs the processed signal to the multiple primary color monitor MPM.

Following the color conversion processing performed by the color conversion processor 258 as described above, the object is reproduced in colors suggesting that the object is being illuminated by the illuminant illuminating the environment in which the multiple primary color monitor MPM is set, and therefore an observer observing the multiple primary color monitor MPM can observe a highly realistic reproduced image.

The MS-RGB conversion processor 256 performs processing to convert the multi-spectral image data processed by the NR processor 254 into RGB image data. When the digital camera 100 is set in an RGB image data recording mode, RGB image data generated as a result of the conversion processing performed by the MS-RGB processor are subjected to compression processing if necessary and then recorded in the image storage unit 146 as an RGB image data file generated in accordance with a predetermined format.

Further, when an RGB monitor RGBM is connected to the digital camera 100, and the operating mode of the digital camera 100 is set at the image reproduction mode, the color/gamma correction processor 260 performs color/gamma correction processing on the RGB image data generated through the processing performed by the MS-RGB processor 256. The color/gamma correction processor 260 obtains the monitor profile information of the RGB monitor RGBM in advance. The color/gamma correction processor 260 then performs color conversion processing and gamma correction processing on the basis of the monitor profile information and outputs the processed signal to the RGB monitor RGBM.

Incidentally, when so-called post view display (display of an image obtained through image pickup for a fixed time immediately after image pickup) is performed on the image display 144 of the digital camera 100, an image based on the RGB image data generated through the processing performed by the color/gamma correction processor 260 is displayed on the image display 144.

The second signal processor 210 includes a white balance correction unit 212 (denoted by WB correction unit in FIG. 2), an RGB demosaicing processor 214, a color correction processor 216, a gamma correction processor 218, and an NR processor 220.

The white balance correction unit 212 performs white balance correction processing on the digital image signal in accordance with a white balance mode set in advance in the digital camera 100. For example, when the white balance mode of the digital camera 100 is set at one of several preset white balance modes such as tungsten light, neutral white fluorescent light, daylight fluorescent light, sunlight, cloudy sky, and flash light, white balance correction processing corresponding to the set preset white balance mode is performed on the digital image signal. Further, when the digital camera 100 is set in an automatic white balance mode, the white balance correction unit 212 performs processing for estimating a light source type by analyzing the digital image signal. White balance correction processing corresponding to the estimated light source type is then performed.

The RGB demosaicing processor 214 performs demosaicing processing on the digital image signal to generate image data having RGB three-color pixel values for each pixel, and stores the generated image data temporarily in the buffer memory 142. It should be noted that in this specification, the object is referred to as a digital image signal if the demosaicing processing is not made, and is referred to as image data if the demosaicing processing is made.

The color correction processor 216 performs color correction processing on the image data stored temporarily in the buffer memory 142 in accordance with a color reproduction characteristic of the image display 144, a tone reproduction mode set in advance in the digital camera 100, and so on.

The gamma correction processor 218 performs gradation correction processing on the image data. For example, when the digital image signal output from the imaging device 110 has a 12-bit bit depth but a display gradation on the image display 144 is 8 bits for each of RGB, a gamma correction characteristic is applied to the digital image signal such that the gradation is compressed in a highlight portion and a shadow portion while gradation information in an intermediate portion is preserved as far as possible. At this time, the gamma correction processing is performed taking into account a gradation reproduction characteristic of the image display 144. It should be noted that when the image data generated by the second signal processor 210 are image data for recording a moving image, a different gamma correction characteristic to that described above may be applied.

The NR processor 220 performs noise reduction processing on the image data through coring processing, median filter processing, and so on.

The live view display processor 234 generates live view image data, or in other words image data for displaying a live view image on the image display 144, on the basis of the image data subjected to the aforesaid noise reduction processing, and outputs the generated live view image data to the image display 144.

As described above, the system controller 140 issues control signals to the sensor controller 120 and the image signal processor 200 in accordance with the operating condition of the digital camera 100. To perform live view display, an image signal read from the imaging device 110 in the second signal readout mode is processed by the second signal processor 210 and then displayed as a live view image on the image display 144. Further, during multi-spectral still image photography, an image signal read from the imaging device 110 in the first signal readout mode is processed by the first signal processor 250 to generate a multi-spectral image data file that is recorded in the image storage unit 146. At this time, RGB image data are generated from the multi-spectral image data as required, whereupon processing for displaying the generated RGB image data on the RGB monitor and processing for generating an RGB image data file are performed.

FIG. 3 is a schematic view showing examples of arrays of color filters that are provided on photodiodes (photoelectric conversion units) arranged two-dimensionally on the light reception unit 111 of the imaging device 110. In FIG. 3, the imaging device 110 includes color filters in a total of five colors, namely R, G, B, C (cyan), and O (orange).

Hereafter, spectral sensitivity characteristics determined by combinations of respective spectral transmission characteristics of the color filters in the respective colors R, G, B, C, O and spectral sensitivity characteristics of the photoelectric conversion units (photodiodes) arranged on the imaging device 110 will be referred to as a spectral sensitivity characteristic of an R pixel, a spectral sensitivity characteristic of a B pixel, a spectral sensitivity characteristic of a G pixel, a spectral sensitivity characteristic of a C pixel, and a spectral sensitivity characteristic of an O pixel. Further, when describing the color filter array, a left-right direction of FIG. 3 will be referred to as a row direction and an up-down direction will be referred to as a column direction.

A combination of the respective spectral sensitivity characteristics of the R pixel, the G pixel, and the B pixel, from among the pixels of the aforesaid five colors, is capable of covering a visible light wavelength band extending from a wavelength of 380 nm to a wavelength of 780 nm. In other words, image signals output from the R pixel, the G pixel, and the B pixel include colors corresponding to the three primary colors R, G, B. By combining image signals obtained from the C pixel and the O pixel with the image signals obtained from the R pixel, G pixel, and B pixel, an image having an enlarged gamut can be obtained, and the effect of observer metamerism is reduced.

Figure 3A:
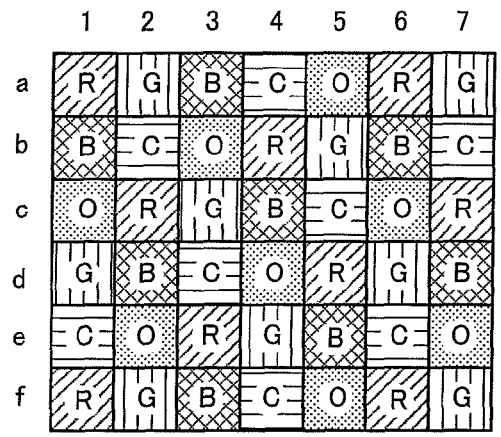
FIG. 3A is a view illustrating an array of color filters disposed on a single plate imaging device provided in a digital camera according to a first embodiment of this invention, in which color filters in all colors are arranged.
Figure 3B:
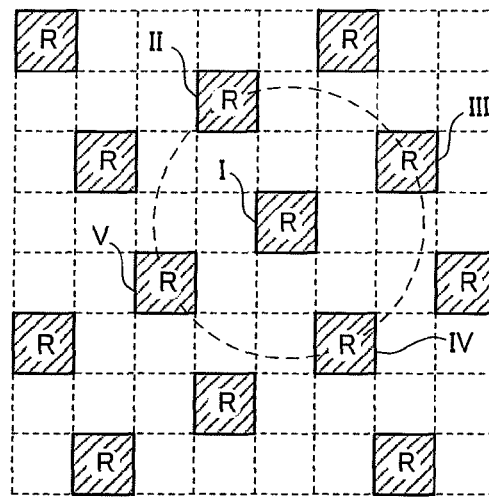
FIG. 3B is a view illustrating an array of R color filters from among the color filters arranged on the single plate imaging device provided in the digital camera according to the first embodiment of this invention.

FIG. 3A shows a two-dimensional array of the R, G, B, C, and O color filters that is regular in the row direction and the column direction. FIG. 3B is a view showing only the array of the R color filters extracted from FIG. 3A. FIGS. 3C to 3G are views illustrating unit arrays of the R, G, B, C, and O color filters, respectively.

First, referring to FIG. 3B, a color filter in an arbitrary position on a color filter array of a single color, for example a color filter having a reference symbol I in FIG. 3B (to be referred to as a color filter I), is set as a reference, whereupon four color filters (color filters II, III, IV, V) disposed in closest proximity to the color filter I and so as to surround the periphery of the color filter I are arranged in equidistant positions from the color filter I. The regularity of this array is maintained when another color filter, for example the color filter V, is set as the reference. As a result, the color filters are disposed at equal distances.

Figure 3C:
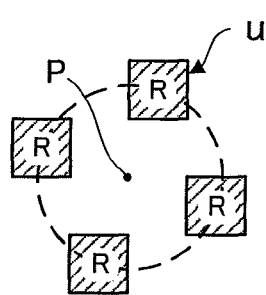
FIG. 3C is a view illustrating an array unit of the R color filters from among the color filters arranged on the single plate imaging device provided in the digital camera according to the first embodiment of this invention.
Figure 3D:
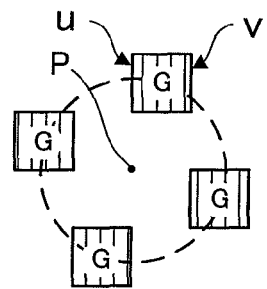
FIG. 3D is a view illustrating an array unit of G color filters from among the color filters arranged on the single plate imaging device provided in the digital camera according to the first embodiment of this invention.
Figure 3E:
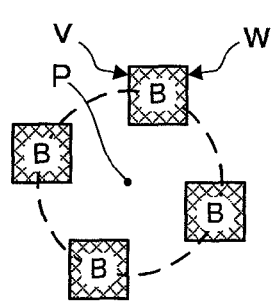
FIG. 3E is a view illustrating an array unit of B color filters from among the color filters arranged on the single plate imaging device provided in the digital camera according to the first embodiment of this invention.
Figure 3F:
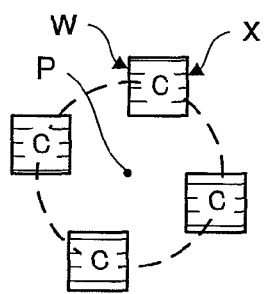
FIG. 3F is a view illustrating an array unit of C color filters from among the color filters arranged on the single plate imaging device provided in the digital camera according to the first embodiment of this invention.
Figure 3G:
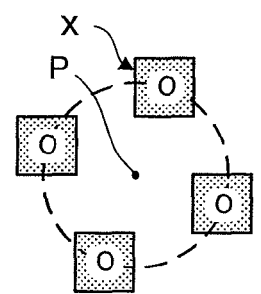
FIG. 3G is a view illustrating an array unit of O color filters from among the color filters arranged on the single plate imaging device provided in the digital camera according to the first embodiment of this invention.

FIG. 3C shows four color filters disposed in closest proximity to each other, extracted from the R color filters provided on the photodiodes arranged two-dimensionally on the light reception unit 111 of the imaging device 110. These four color filters are disposed at equal distances on a single circle centering on a point P. The regularity of this array is maintained in an identical manner in the color filters of the other colors, as shown in FIGS. 3D to 3G.

The color filter array shown in FIG. 3A is formed by combining the respective unit arrays of the color filters arranged as shown in FIGS. 3C to 3G. More specifically, the color filter array shown in FIG. 3A is completed by combining the color filters of the unit arrays shown in FIGS. 3C to 3G such that sides allocated reference symbols u, v, w, x contact sides having the same reference symbol.

With the color filter arrangement shown in FIG. 3, sampling spatial frequencies are all identical, regardless of the color of the color filter.

Image signal readout methods employed in the first and second signal readout modes will now be described with respect to a case in which the digital camera 100 described with reference to FIGS. 1 and 2 includes the imaging device 110 having the on-chip color filter array described above with reference to FIG. 3.

In the first signal readout mode, image signals are read in accordance with the all pixel readout mode. The sensor controller 120 outputs a control signal to the vertical scanning circuit 112 and the horizontal reading circuit 113, whereby an image signal is read from the imaging device 110 in a manner to be described below with reference to FIG. 3A.

When the exposure operation is complete, the vertical scanning circuit 112 specifies a horizontal line allocated a reference symbol a (hereafter, respective horizontal lines allocated reference symbols a, b, c, . . . will be referred to as a horizontal line a, a horizontal line b, . . . ) in FIG. 3A. The horizontal reading circuit 113 then outputs a timing signal to the light reception unit 111 so that image signals are output in a point sequential manner from a pixel in a column allocated a reference numeral 1, a pixel in a column allocated a reference numeral 2 (hereafter, pixels in columns allocated reference numerals 1, 2, 3, . . . will be referred to as the pixel in a column 1, the pixel in a column 2, . . . ) . . . . When image signal readout from the horizontal line a is complete, a similar image signal reading operation is performed on the horizontal line b, a horizontal line c, and so on. As a result, image signals in five colors, output from the pixels of all of the colors, i.e. the R pixel, the G pixel, the B pixel, the C pixel, and the O pixel, are read from the imaging device 110.

In the second signal readout mode, image signals are read in accordance with the skip readout mode. When the exposure operation is complete, the vertical scanning circuit 112 specifies the horizontal line a. The horizontal reading circuit 113 then outputs a timing signal to the light reception unit 111 so that image signals are output in a point sequential manner from the pixel in column 1, the pixel in column 2, and the pixel in column 3 (an R pixel, a G pixel, and a B pixel). The horizontal reading circuit 113 then outputs a timing signal to the light reception unit 111 so that column 4 and column 5 (columns of the C pixel and the O pixel) are skipped and image signals are output in a point sequential manner from the pixel in column 6, the pixel in column 7, and the pixel in column 8 (an R pixel, a G pixel, and a B pixel). This operation for skipping two consecutive columns (columns of the C pixel and the O pixel) and reading image signals in a point sequential manner from the pixels in three consecutive columns (columns of the R pixel, G pixel, and B pixel) is then performed repeatedly in a similar manner up to an end column of the horizontal line a.

When image signal readout from the horizontal line a is complete, the vertical scanning circuit 112 specifies the horizontal line b. Then, in relation to the horizontal line b, the horizontal reading circuit 113 outputs a timing signal to the light reception unit 111 so that image signals are output first from the pixel in column 1. The operation for skipping two consecutive columns and reading image signals in a point sequential manner from the pixels in three consecutive columns is then performed repeatedly up to the end column of the horizontal line b.

Similarly, the horizontal reading circuit 113 outputs a timing signal to the light reception unit 111 such that on the horizontal line c, column 1 is skipped and image signals are output in a point sequential manner from the pixel in column 2, the pixel in column 3, and the pixel in column 4. The operation for skipping two consecutive columns and reading image signals in a point sequential manner from the pixels in three consecutive columns is then performed repeatedly up to the end column of the horizontal line c.

The image signal reading operation in the second signal readout mode is then performed repeatedly in a similar manner until the final horizontal line of the reading subject lines is reached.

In the example described above, when an image signal reading operation is performed in the second signal readout mode, image signals are read from all horizontal lines, and at this time, image signals are read only from the R pixels, G pixels, and B pixels such that image signals corresponding to colors other than the R pixels, G pixels, and B pixels are skipped and therefore not read. In other words, image signal reading from the C pixels and O pixels is skipped through color skipping, and as a result, the time required to read an image signal from the imaging device 110 can be shortened.

With respect to the above example, when an image signal reading operation is performed in the second signal readout mode, skip readout may be implemented such that image signals are read from one or a plurality of horizontal lines in groups of a certain number of horizontal lines. By implementing image signal reading through color skipping as described above, the time required to read an image signal from the imaging device 110 can be shortened even further.

Moreover, in the example described above, image signal reading from the C pixels and the O pixels is skipped as a result of the color skipping, but as long as the amount of information in the image signal read in the second signal readout mode is smaller than the amount of information in the image signal read in the first signal readout mode, image signal reading may be skipped with respect to only the C pixels or only the O pixels. Important thing is that the information amount of the image signal obtained in the second signal readout mode is reduced in comparison to the information amount of the image signal obtained in the first signal readout mode.

-Second Embodiment-

Figures 4A, 4B:
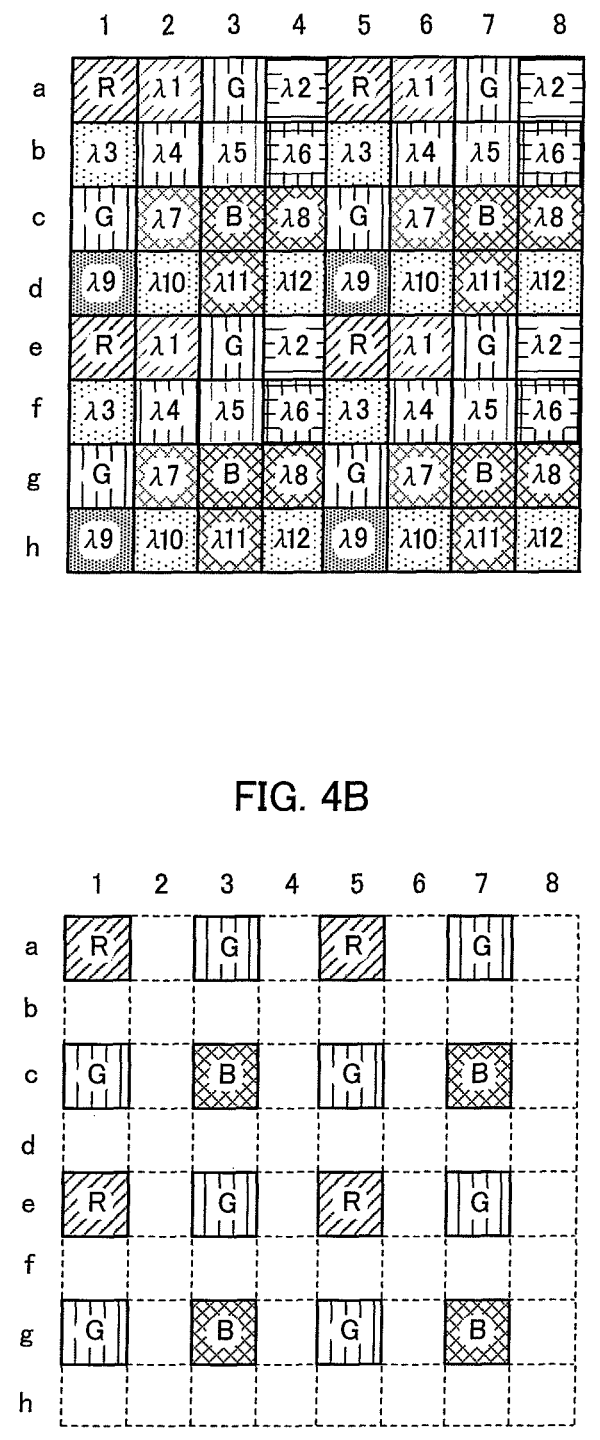

FIG. 4 is a schematic view showing an example of an array of color filters provided on photodiodes (photoelectric conversion units) arranged two-dimensionally on the light reception unit 111 of the imaging device 110 provided in the digital camera 100 according to a second embodiment of this invention. FIG. 4A shows an arrangement of color filters in all colors, while FIG. 4B shows an arrangement in which the color filters of three colors, namely R, G, B are extracted from the arrangement shown in FIG. 4A.

As shown in FIG. 4A, the imaging device 110 includes color filters in a total of fifteen colors, namely $\lambda 1, \lambda 2, \ldots, \lambda 12$ in addition to R, G, B. Further, as shown in FIG. 4B, the number of arranged G filters is twice that of the other colors, and therefore, focusing solely on the arrangement of the R, G, B color filters, a Bayer array is realized. Likewise in this embodiment, spectral sensitivity characteristics determined from combinations of the respective spectral transmission characteristics of the color filters in all of the colors R, G, B, $\lambda 1, \lambda 2, \ldots, \lambda 12$ and the spectral sensitivity characteristics of the photoelectric conversion units (photodiodes) arranged on the imaging device 110 will be referred to as the spectral sensitivity characteristic of the R pixel, the spectral sensitivity characteristic of the G pixel, the spectral sensitivity characteristic of the B pixel, the spectral sensitivity characteristic of an $\lambda 1$ pixel, the spectral sensitivity characteristic of an $\lambda 2$ pixel, ..., and the spectral sensitivity characteristic of an $\lambda 12$ pixel.

Likewise in the example shown in FIG. 4, a combination of the respective spectral sensitivity characteristics of the R pixel, the G pixel, and the B pixel, from among the pixels of the aforesaid fifteen colors, is capable of covering a visible light wavelength band of wavelength 380 nm to 780 nm. By combining image signals obtained from pixels in the twelve colors $\lambda 1$ to $\lambda 12$ with the image signals obtained from the R pixels, G pixels, and B pixels, more accurate image reproduction with an enlarged gamut can be realized.

Various spectral sensitivity characteristics may be set as the spectral sensitivity characteristics of the respective pixels from the $\lambda 1$ pixel to the $\lambda 12$ pixel, such as a characteristic exhibiting a narrower band or a wider band than the spectral sensitivity characteristics of the R pixel, G pixel, and B pixel, a characteristic exhibiting sensitivity to an infrared band or an ultraviolet band, and so on.

The manner in which image signals are read in the first and second signal readout modes in a case where the digital camera 100 described with reference to FIGS. 1 and 2 includes the imaging device 110 formed with on-chip color filters as described above with reference to FIG. 4 will now be described.

In the first signal readout mode, image signals are read in accordance with the all pixel readout mode. The sensor controller 120 outputs control signals to the vertical scanning circuit 112 and the horizontal reading circuit 113 such that image signals are read from the imaging device 110 in a manner to be described below with reference to FIG. 4A.

When the exposure operation is complete, the vertical scanning circuit 112 specifies a horizontal line a in FIG. 4A. The horizontal reading circuit 113 then outputs a timing signal to the light reception unit 111 so that image signals are output in a point sequential manner from the pixel in column 1, the pixel in column 2, .... When image signal readout from the horizontal line a is complete, a similar image signal reading operation is performed on a horizontal line b, a horizontal line c, and so on. As a result, image signals in fifteen colors output respectively from the $\lambda 1$ pixel, $\lambda 2$ pixel, ..., $\lambda 12$ pixel, R pixel, G pixel, and B pixel are read from the imaging device 110.

In the second signal readout mode, image signals are read in accordance with the skip readout mode. When the exposure operation is complete, the vertical scanning circuit 112 specifies the horizontal line a. The horizontal reading circuit 113 then outputs a timing signal to the light reception unit 111 so that image signals are output in a point sequential manner from pixels (R pixels and G pixels) in odd number columns of the horizontal line a, namely column 1, column 3, column 5, column 7, ....

When image signal readout from the horizontal line a is complete, the vertical scanning circuit 112 specifies the horizontal line c. The horizontal reading circuit 113 then outputs a timing signal to the light reception unit 111 in relation to the horizontal line c so that image signals are output likewise in a point sequential manner from the pixels (G pixels and B pixels) in the odd number columns.

The image signal reading operation in the second signal readout mode, whereby timing signals are output to the light reception unit 111 such that every other horizontal line is specified and image signals are output in a point sequential manner from the pixels in the odd number columns of the specified horizontal line, is then performed repeatedly in a similar manner until the final horizontal line is reached. The gamut that can be reproduced by the image signal read in the second signal readout mode is narrower than the gamut that can be reproduced by the image signal read in the first signal readout mode.

It is assumed in the above description that the R pixels, G pixels, and B pixels are arranged as shown in FIG. 4. However, this invention is not limited to the example shown in FIG. 4, and various other arrays may be employed. More specifically, in FIG. 4, a single array unit is constituted by sixteen pixels, i.e. four pixels in the horizontal direction×four pixels in the vertical direction, and the R pixels, G pixels, and B pixels are allocated to positions on the odd number rows and odd number columns of the respective array units. Instead of this array, however, the R pixels, G pixels, and B pixels may be allocated to pixels in positions on the even number rows and even number columns of the respective array units. Further, the numbers of pixels in the row direction and the column direction constituting a single array unit may be larger than four, and the arrangement of the R pixels, G pixels, and B pixels in the respective array units may be modified variously. In this case, the specified lines and reading subject columns of the skip reading operation should be varied in accordance with the array of the R pixels, G pixels, and B pixels. Further, in the example described above, image signals are read from all of the R pixels, G pixels, and B pixels during the image signal reading operation in the second signal readout mode, but image signals do not necessarily have to be read from all of the R pixels, G pixels, and B pixels.

As shown in FIG. 4B, the image signals read in the second signal readout mode as described above form a similar color arrangement to that of image signals read from an imaging device having a Bayer array. Therefore, a conventional Bayer interpolation algorithm can be used in the demosaicing processing, leading to an improvement in the efficiency of the processing.

Further, during the image signal reading operation in the second signal readout mode, pixel addition readout may be implemented in place of, or in addition to, the skip readout. To describe an example of pixel addition readout with reference to FIG. 4B, pixel addition readout can be implemented by specifying the horizontal line a and a horizontal line e simultaneously, specifying the pixels in the odd number columns, and then reading the image signals in a point sequential manner. Thereafter, pixel addition readout can be implemented by specifying the horizontal line c and a horizontal line g simultaneously, specifying the pixels in the odd number columns, and reading the image signals in a point sequential manner.

Needless to mention, the number of added lines and so on during pixel addition may be varied in accordance with the specifications of the imaging device 110 and the pixel count of the image data obtained in the reading operation.

In the first and second embodiments, examples were described in which the image signals read in the second signal readout mode include colors corresponding to the three primary colors R, G, B. However, this invention is not limited thereto, and image signals in colors with which a predetermined gamut can be formed, such as colors corresponding to Y (yellow), C (cyan), and M (magenta), for example, may also be read. Further, depending on the application of the digital camera 100, image signals in two colors or one color may be read in the second signal readout mode. Image signals in any color from R, G, B, Y, C, M, or the like, for example, may be read as the image signal in one color. Image signals in any color combination selected from G and B, B and R, R and G, Y and C, C and M, M and Y, and so on, for example, may be read as the image signals in two colors.

-Third Embodiment-

Figures 5A, 5B:
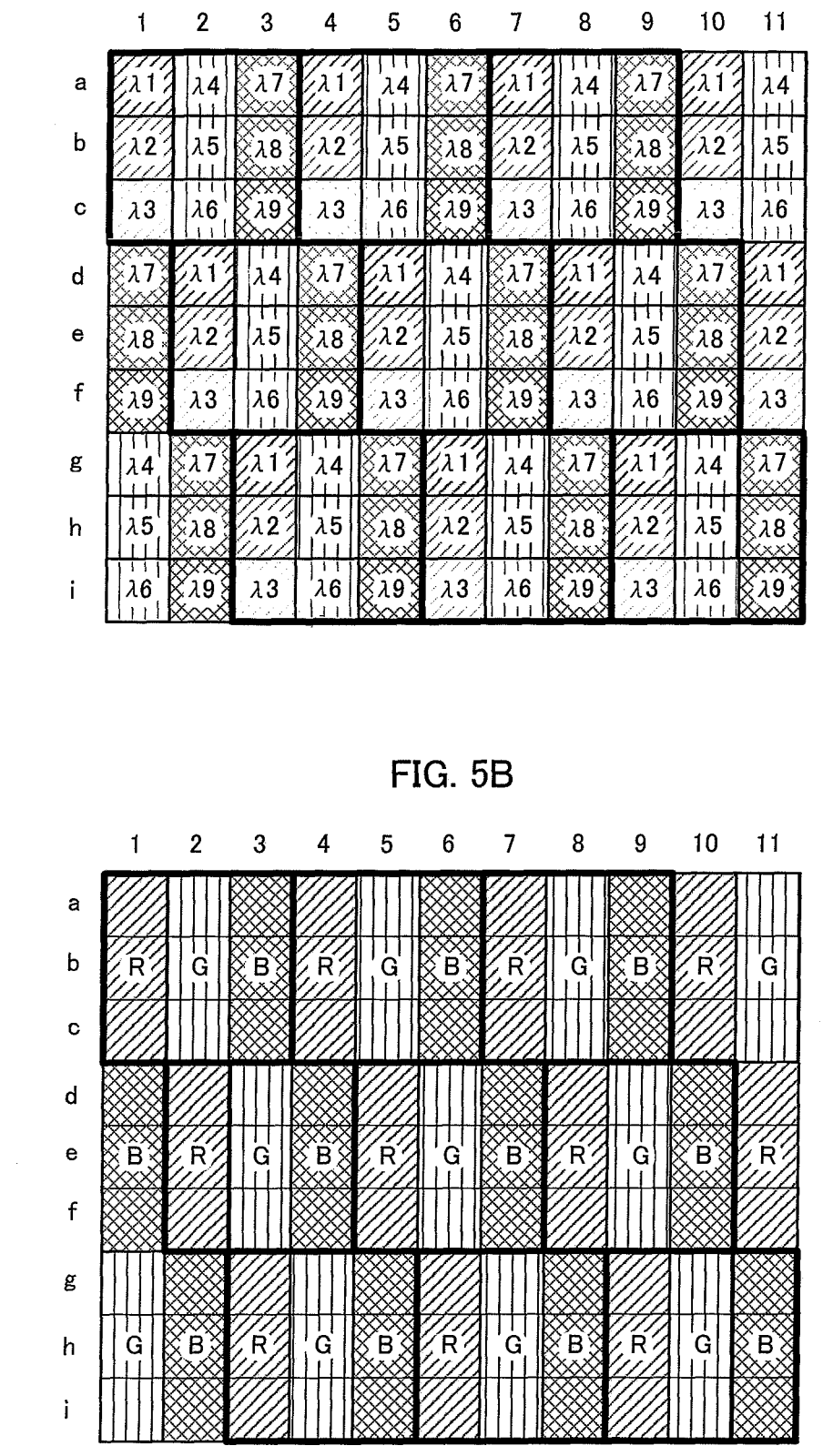

FIG. 5 is a schematic view showing an example of an array of color filters provided on photodiodes (photoelectric conversion units) arranged two-dimensionally on the light reception unit 111 of the imaging device 110 provided in the digital camera 100 according to a third embodiment of this invention. FIG. 5A shows a regular array of color filters in nine colors, namely $\lambda 1$ to $\lambda 9$. Likewise in this embodiment, spectral sensitivity characteristics determined from combinations of the respective spectral transmission characteristics of the color filters in the nine colors $\lambda 1, \lambda 2, \ldots, \lambda 9$ and the spectral sensitivity characteristics of the photoelectric conversion units (photodiodes) arranged on the imaging device 110 will be referred to as the spectral sensitivity characteristic of the $\lambda 1$ pixel, the spectral sensitivity characteristic of the $\lambda 2$ pixel, ..., and the spectral sensitivity characteristic of the $\lambda 9$ pixel.

FIG. 5B is a view showing the manner in which image signals corresponding to R, G, and B are obtained equivalently from pixel positions of the $\lambda 1$ pixel, $\lambda 2$ pixel, and $\lambda 3$ pixel, the $\lambda 4$ pixel, $\lambda 5$ pixel, and $\lambda 6$ pixel, and the $\lambda 7$ pixel, $\lambda 8$ pixel, and $\lambda 9$ pixel when pixel addition readout is implemented on these pixels. Here, the image signals corresponding to R, G, and B are image signals in colors constituting the three primary colors which, when combined, are capable of covering a visible light wavelength band of wavelength 380 nm to 780 nm.

In FIG. 5A, the color filters of the respective colors are arranged by arranging the color filters of $\lambda 1$ to $\lambda 9$ into a tile-shaped square of three color filters in the row direction× three color filters in the column direction, thereby composing a single unit array, and arranging the unit arrays in the row direction and the column direction. Square frames outlined by thick lines in FIG. 5A denote the respective unit arrays. In the array example shown in FIG. 5A, a certain unit array and a unit array disposed adjacent to the certain unit array in the column direction are offset from each other by a single pixel in the row direction. In other words, when a second row is arranged next to a first row formed by arranging a plurality of unit arrays in the row direction (the horizontal direction), the second row is offset by one pixel in the row direction. As a result, a staggered formation in which the unit arrays are offset by single pixels from the first row to the second row and from the second row to a third row is obtained.

Figure 6:
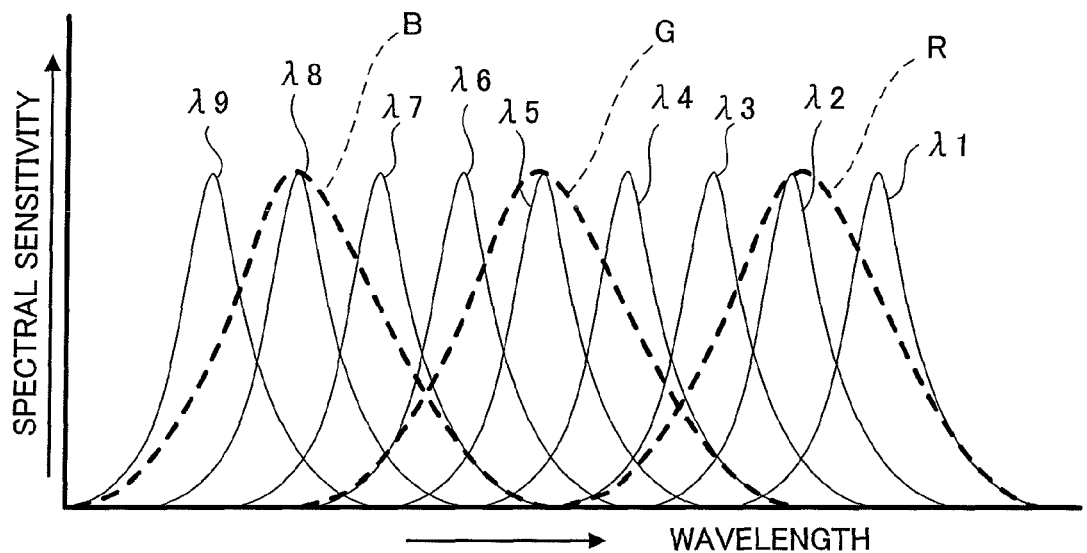
FIG. 6 is a schematic view showing an example of a spectral sensitivity characteristic of each color, which is obtained from a combination of spectral transmission characteristics of the respective color filters shown in FIG. 5 and a spectral sensitivity characteristic of the imaging device, and spectral characteristics of signals obtained by pixel addition readout.

FIG. 6 is a graph showing an outline of the respective spectral sensitivity characteristics of the $\lambda 1$ pixel to the $\lambda 9$ pixel. In FIG. 6, reference symbols $\lambda 1$ to $\lambda 9$ are affixed to the spectral sensitivity characteristics of the pixels in the respective colors. Further, reference symbols R, G, B are affixed to three curves represented by thick dotted lines. In FIG. 6, the characteristics are determined such that $\lambda 9$ is sensitive to light having a wavelength of 380 nm and $\lambda 1$ is sensitive to light having a wavelength of 780 nm.

The spectral transmission characteristics of the $\lambda 1$, $\lambda 2$, and $\lambda 3$ filters are determined such that when an image signal is read from the λ1, λ2, and λ3 pixels through pixel addition, the image signal read from the λ1 pixel, λ2 pixel, and λ3 pixel is substantially identical to an image signal read equivalently from a pixel having the spectral sensitivity characteristic of R. Further, the spectral transmission characteristics of the λ4, λ5, and λ6 filters are determined such that an image signal read through pixel addition from the λ4 pixel, λ5 pixel, and λ6 pixel is substantially identical to an image signal read equivalently from a pixel having the spectral sensitivity characteristic of G. Furthermore, the spectral transmission characteristics of the λ7, λ8, and λ9 filters are determined such that an image signal read through pixel addition from the λ7 pixel, λ8 pixel, and λ9 pixel is substantially identical to an image signal read equivalently from a pixel having the spectral sensitivity characteristic of B.

When the respective spectral sensitivity characteristics of the λ1 pixel, the λ2 pixel, ..., and the λ9 pixel are set as λ1, λ2, ..., λ9 and the respective spectral sensitivity characteristics of R, G and B are set as R, G, B, the above can be expressed as:

$$R \approx \lambda1 + \lambda2 + \lambda3 \qquad \text{Equation (1)}$$

$$G \approx \lambda4 + \lambda5 + \lambda6 \qquad \text{Equation (2)}$$

$$B \approx \lambda7 + \lambda8 + \lambda9 \qquad \text{Equation (3)}$$

By determining the respective spectral sensitivity characteristics of the λ1 pixel to the λ9 pixel as illustrated above and performing setting such that the results of the pixel addition readout are as close as possible to the spectral sensitivity characteristics of R, G, and B, a favorable color separation ability can be obtained. By applying a color correction matrix prepared in accordance with the addition readout operation at this time, a favorable color reproduction performance can also be obtained.

It should be noted that the graph of FIG. 6 shows the spectral sensitivity characteristics of the pixels of the respective colors schematically, and this graph has been normalized by a maximum value of the spectral sensitivity characteristic of each color. Needless to say, the spectral sensitivity profile (a center wavelength, a bandwidth, and so on of the sensitivity) of each color may be modified variously in accordance with goals.

The spectral sensitivity characteristics of R, G, and B are set such that a combination of the spectral sensitivity characteristics of R, G, and B is capable of covering a visible light wavelength band. In other words, the image signals obtained by implementing pixel addition readout respectively on the, λ1 pixel to the λ3 pixel, the λ4 pixel to the λ6 pixel, and the λ7 pixel to the λ9 pixel include colors corresponding to the three primary colors R, G, B.

The manner in which image signals are read in the first and second signal readout modes in a case where the digital camera 100 described with reference to FIGS. 1 and 2 includes the imaging device 110 formed with on-chip color filters as described above with reference to FIG. 5 will now be described.

In the first signal readout mode, image signals are read in accordance with the all pixel readout mode. The sensor controller 120 outputs control signals to the vertical scanning circuit 112 and the horizontal reading circuit 113 such that an image signal is read from the imaging device 110 in a manner to be described below with reference to FIG. 5A.

When the exposure operation is complete, the vertical scanning circuit 112 specifies a horizontal line a in FIG. 5A. The horizontal reading circuit 113 then outputs a timing signal to the light reception unit 111 so that image signals are output in a point sequential manner from the pixel in column 1, the pixel in column 2, .... When image signal readout from the horizontal line a is complete, a similar image signal reading operation is performed on a horizontal line b, a horizontal line c, and so on. As a result, image signals in all nine colors output respectively from the λ1 pixel, the λ2 pixel, ..., the λ9 pixel are read from the imaging device 110.

In the second signal readout mode, image signals are read in accordance with the pixel addition readout mode. When the exposure operation is complete, the vertical scanning circuit 112 specifies three lines, namely the horizontal lines a, b, and c, simultaneously. The horizontal reading circuit 113 then outputs a timing signal to the light reception unit 111 so that image signals are read in a point sequential manner from the pixel in column 1 to the pixel in the final column of the horizontal lines a, b and c.

When image signal reading (pixel addition reading) from the horizontal lines a, b and c in this manner is complete, the vertical scanning circuit 112 specifies horizontal lines d, e and f. The horizontal reading circuit 113 then outputs a timing signal to the light reception unit 111 likewise in relation to the horizontal lines d, e and f such that image signals are read in a point sequential manner from the pixel in column 1 to the pixel in the final column.

The image signal reading operation in the second signal readout mode, whereby timing signals are output to the light reception unit 111 such that three horizontal lines at a time are specified and image signals are output in a point sequential manner from the pixels in all of the columns of the specified horizontal lines, is then performed repeatedly in a similar manner until the final horizontal line is reached. The gamut that can be reproduced by the image signal read in the second signal readout mode is narrower than the gamut that can be reproduced by the image signal read in the first signal readout mode.

In the example described above, image signals are read by implementing pixel addition readout from the pixels in all of the columns of all horizontal lines during the image signal reading operation in the second signal readout mode. However, skip readout may be performed additionally in accordance with a required resolution (pixel size).

In the example described above, R, G, B image signals are obtained by implementing addition readout in the column direction of the two-dimensionally arranged pixels, but the R, G, B image signals may be obtained by implementing addition readout in the row direction. To describe a 3×3 unit array applied in this case, the λ1 pixel, the λ2 pixel, and the λ3 pixel are arranged in the row direction (horizontal direction) of a first row, the λ4 pixel, the λ5 pixel, and the λ6 pixel are arranged in the row direction of a second row, and the λ7 pixel, the λ8 pixel, and the λ9 pixel are arranged in the row direction of a third row.

When forming unit arrays as described above and arranging the unit arrays in the row direction (horizontal direction), the unit arrays are preferably offset respectively by single pixels in the column direction. In other words, the unit arrays are preferably disposed at respective offsets of single pixels in the column direction, in contrast to the arrangement shown in FIG. 5, where the unit arrays are offset respectively by single pixels in the row direction to obtain a staggered formation.

In the example described above with reference to FIG. 5, a single unit array is formed from nine pixels arranged in a square, and the R, G, B image signals are obtained by implementing pixel addition readout on groups of three pixels arranged in the column direction. However, this invention is not limited to this example, and the color filters may be disposed in various other arrangements, as illustrated in the following examples.

FIG. 7 is a view illustrating an example in which the unit array is formed from 4 pixels×4 pixels=16 pixels, and during pixel addition readout, two pixels in the row direction and the column direction, or in other words four pixels, are subjected to pixel addition readout.

Figure 7A:
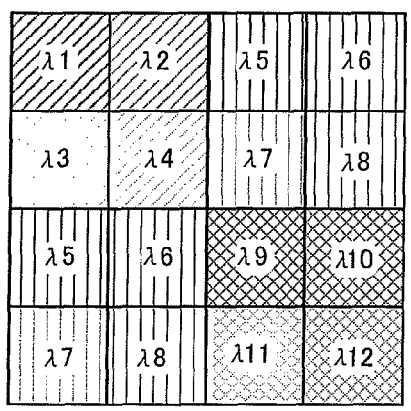
FIG. 7A is a view showing a different example to FIG. 5 of an array of the color filters disposed on the single plate imaging device provided in the digital camera according to the third embodiment of this invention, in which the color filters in all colors are arranged.

FIG. 7A shows color filters from λ1 to λ12 arranged in a square tile shape to form a single unit array of four color filters in the row direction×four color filters in the column direction. In FIG. 7A, the number of arranged color filters having the spectral sensitivity characteristics of λ5 to λ8 is twice the number of arranged color filters (λ1 to λ4, λ9 to λ12) having other spectral sensitivity characteristics. Further, the four color filters having the spectral sensitivity characteristics of λ5 to λ8 form a square sub-unit of two color filters in the row direction×two color filters in the column direction, and the sub-unit is arranged in diagonally opposite positions within the unit array. In FIG. 7A, the sub-unit is disposed in upper right and lower left positions. The color filter array is formed by arranging the unit array shown in FIG. 7A in the row direction and the column direction.

Likewise in this example, spectral sensitivity characteristics determined from combinations of the respective spectral transmission characteristics of the color filters in the colors λ1, λ2, . . . , 12 and the spectral sensitivity characteristics of the photoelectric conversion units (photodiodes) arranged on the imaging device 110 will be referred to as the spectral sensitivity characteristic of the λ1 pixel, the spectral sensitivity characteristic of the λ2 pixel, . . . , and the spectral sensitivity characteristic of the λ12 pixel.

Figure 8:
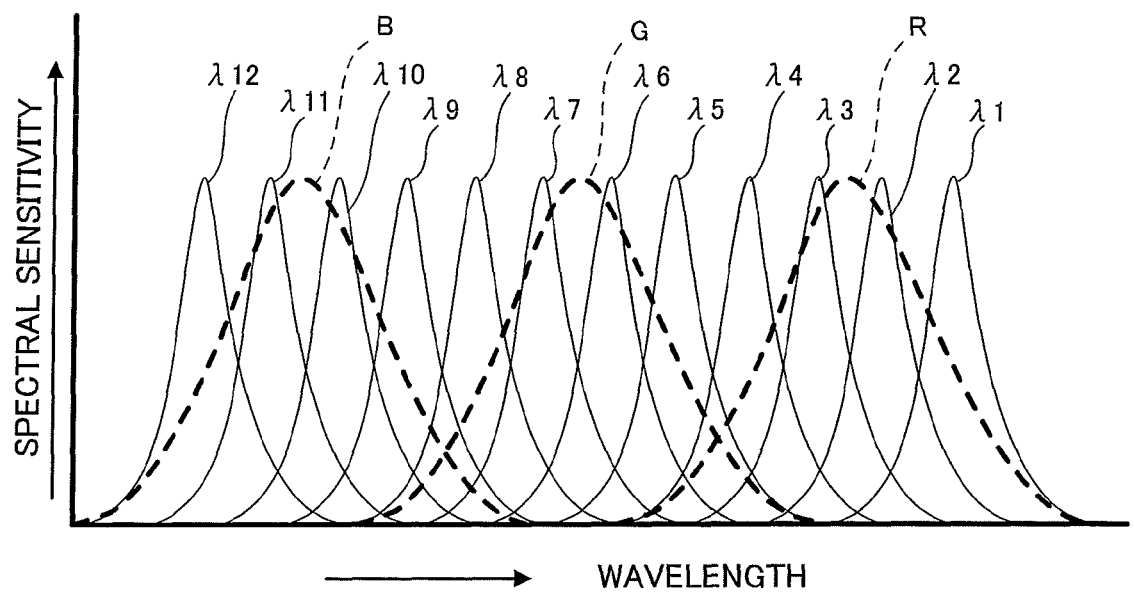
FIG. 8 is a schematic view showing an example of the spectral sensitivity characteristic of each color, which is determined from a combination of the spectral transmission characteristic of the respective color filters shown in FIG. 7 and the spectral sensitivity characteristic of the imaging device, and the spectral characteristics of signals obtained by pixel addition readout.

FIG. 8 is a graph showing the respective spectral sensitivity characteristics of the λ1 pixel to the λ12 pixel shown in FIG. 7A schematically. In FIG. 8, reference symbols λ1 to λ12 are affixed to the spectral sensitivity characteristics of the pixels in the respective colors. Further, reference symbols R, G, B are affixed to three curves represented by thick dotted lines. In FIG. 8, the characteristics are determined such that λ12 is sensitive to light having a wavelength of 380 nm and λ1 is sensitive to light having a wavelength of 780 nm.

The spectral transmission characteristics of the λ1, λ2, λ3, and λ4 filters are determined such that when an image signal is read from the λ1, λ2, λ3, and λ4 pixels through pixel addition, the image signal read from the λ1 pixel, λ2 pixel, λ3 pixel, and λ4 pixel corresponds to an image signal read equivalently from a pixel having the spectral sensitivity characteristic of R. Further, the spectral transmission characteristics of the λ5, λ6, λ7, and λ8 filters are determined such that an image signal read from the λ5 pixel, λ6 pixel, λ7 pixel, and λ8 pixel through pixel addition corresponds to an image signal read equivalently from a pixel having the spectral sensitivity characteristic of G. Furthermore, the spectral transmission characteristics of the λ9, λ10, λ11, and λ12 filters are determined such that an image signal read from the λ9 pixel, λ10 pixel, λ11 pixel, and λ12 pixel through pixel addition corresponds to an image signal read equivalently from a pixel having the spectral sensitivity characteristic of B. A combination of the R, G and B spectral sensitivity characteristics is capable of covering a visible light wavelength band of wavelength 380 nm to 780 nm.

When the respective spectral sensitivity characteristics of the λ1 pixel, the λ2 pixel, . . . , and the λ12 pixel are set as λ1, λ2, . . . , λ12 and the respective spectral sensitivity characteristics of R, G and B are set as R, G, B, the above can be expressed as:

$$R \approx \lambda1+\lambda2+\lambda3+\lambda4 \quad \text{Equation (4)}$$

$$G \approx \lambda5+\lambda6+\lambda7+\lambda8 \quad \text{Equation (5)}$$

$$B \approx \lambda9+\lambda10+\lambda11+\lambda12 \quad \text{Equation (6)}$$

By determining the respective spectral sensitivity characteristics of the λ1 pixel to the λ12 pixel as illustrated above and performing setting such that the results of the pixel addition readout are as close as possible to the spectral sensitivity characteristics of R, G, B, a favorable color separation ability can be obtained.

Figure 7B:
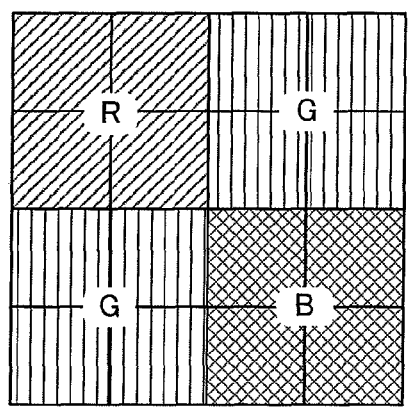
FIG. 7B is a schematic view illustrating a manner in which Bayer array image signals for each of R, G, and B are obtained equivalently when image signals are read in the pixel addition readout mode from the single plate imaging device having the color filter array shown in FIG. 7A.

Further, by arranging the λ1 pixel, the λ2 pixel, . . . , and the λ12 pixel as described above with reference to FIG. 7A, the image signals read in the second signal reading mode have a similar color arrangement to image signals read from an imaging device having a Bayer array, as shown in FIG. 7B. Therefore, a conventional Bayer interpolation algorithm can be used in the demosaicing processing, leading to an improvement in the efficiency of the processing.

In the example described above, the R, G, and B spectral sensitivity characteristics are obtained by combining a plurality of pixels having mutually differing spectral sensitivity characteristics, but this invention is not limited thereto. For example, the imaging device 110 may include λ1 pixels, λ2 pixels, G pixels, and B pixels, and the spectral sensitivity characteristic of R may be obtained by adding together image signals from the λ1 pixel and the λ2 pixel.

In this case, when the respective spectral sensitivity characteristics of the λ1 pixel and the λ2 pixel are set as λ1 and λ2 and the spectral sensitivity characteristic of R is set as R, the above can be expressed as:

$$R \approx \lambda1+\lambda2 \quad \text{Equation (7)}$$

-Fourth Embodiment-

Figure 9:
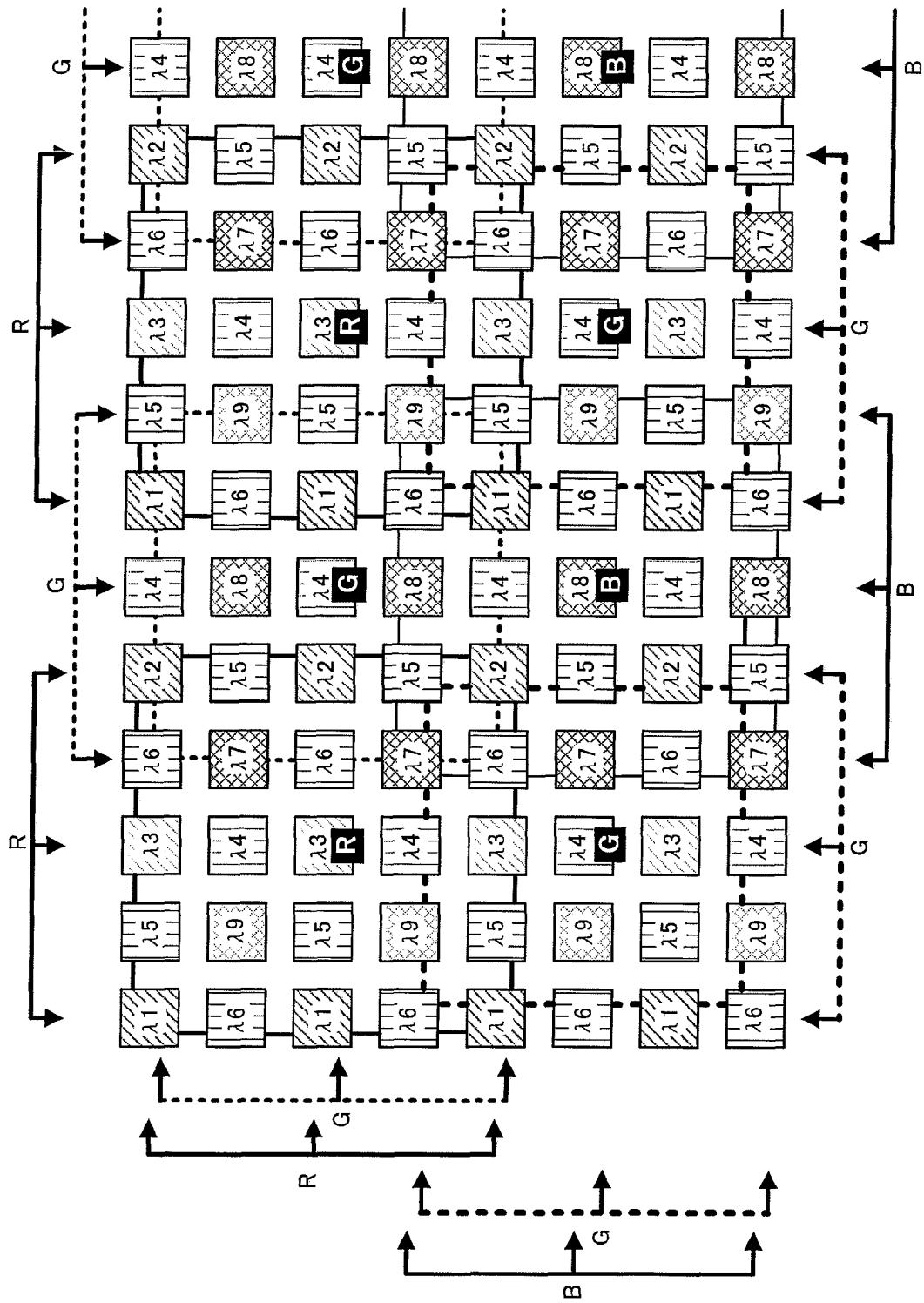
FIG. 9 is a schematic view illustrating an array of color filters disposed on a single plate imaging device provided in a digital camera according to a fourth embodiment of this invention, in which Bayer array image signals for each of R, G, and B are obtained equivalently by combining skip readout and pixel addition.

FIG. 9 is a schematic view showing an example of an array of color filters provided on photodiodes (photoelectric conversion units) arranged two-dimensionally on the light reception unit 111 of the imaging device 110 provided in the digital camera 100 according to a fourth embodiment of this invention. In the example shown in FIG. 9, the arranged color filters exhibit nine spectral sensitivity characteristics, namely λ1, λ2, . . . , λ9. FIG. 9 shows an upper left corner part of the imaging device 100, in which an uppermost row (horizontal line) is set as a first row and subsequent rows are set as a second row and a third row. In the color filter array shown in FIG. 9, an array pattern group is formed from an odd number row and a following even number row.

On the odd number rows, six color filters λ1, λ5, λ3, λ6, λ2, λ4 are arranged in order from the left side of FIG. 9, and this array is repeated regularly as an odd number row unit array up to the end column. On the even number rows, six color filters λ6, λ9, λ4, λ7, λ5, λ8 are arranged in order from the left side of FIG. 9, and this array is repeated regularly as an even number row unit array up to the end column. In other words, a unit array formed by combining the odd number row and even number row unit arrays is constituted by twelve color filters disposed in two rows and six columns, and includes two of each of the color filters λ4, λ5, λ6 and one of each of the color filters of the other colors.

Likewise in this embodiment, spectral sensitivity characteristics determined from combinations of the respective spectral transmission characteristics of the color filters in the colors λ1, λ2, . . . , λ9 and the spectral sensitivity characteristics of the photoelectric conversion units (photodiodes) arranged on the imaging device 110 will be referred to as the spectral sensitivity characteristic of the λ1 pixel, the spectral sensitivity characteristic of the λ2 pixel, . . . , and the spectral sensitivity characteristic of the λ9 pixel.

Figure 10:
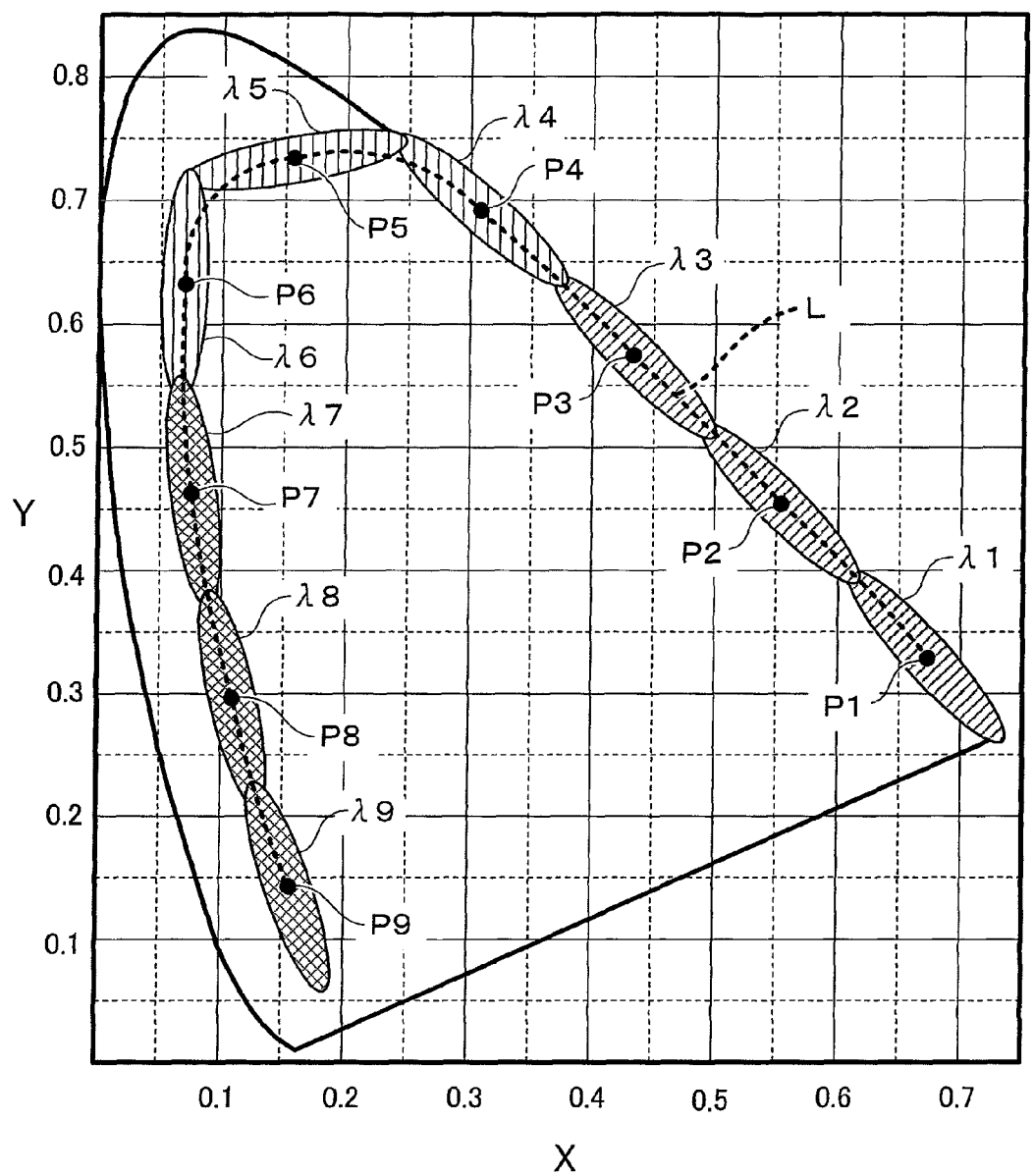
FIG. 10 is a view illustrating an example of setting of the spectral transmission characteristics of the respective color filters shown in FIG. 9.

FIG. 10 is a view showing a manner in which spectral sensitivity bands of the λ1 pixel, the λ2 pixel, . . . , and the λ9 pixel are plotted on an xy chromaticity diagram. FIG. 10 also shows a bell-shaped pattern formed by linking a spectral locus of visible light from wavelength 380 nm to 780 nm and respective ends of the locus by line segments.

As shown in FIG. 10, the respective spectral sensitivity characteristics of λ1 to λ9 are determined so as to substantially follow the spectral locus on the xy chromaticity diagram. Further, the respective spectral sensitivity characteristics are determined such that when x, y coordinate values corresponding to the center wavelengths of the respective spectral sensitivity bands of λ1 to λ9 are determined and plotted on the chromaticity diagram (in FIG. 10, points indicated by reference symbols P1 to P9 show examples thereof) and a curve linking these points (similarly, in FIG. 10, a thick dotted curve indicated by a reference symbol L is an example thereof) is drawn, the resulting line is divided into substantially equal lengths by the points.

In the example shown in FIGS. 9 and 10, λ1, λ2 and λ3 have spectral sensitivity characteristics on a long wavelength side (reddish) of the visible light wavelength band. Similarly, λ4, λ5 and λ6 have spectral sensitivity characteristics in an intermediate wavelength part (greenish) of the visible light wavelength band, and λ7, λ8 and λ9 have spectral sensitivity characteristics on a short wavelength side (bluish).

The manner in which image signals are read in the first and second signal readout modes in a case where the digital camera 100 described with reference to FIGS. 1 and 2 includes the imaging device 110 formed with on-chip color filters as described above with reference to FIGS. 9 and 10 will now be described.

In the first signal readout mode, image signals are read in accordance with the all pixel readout mode. More specifically, when the exposure operation is complete, the vertical scanning circuit 112 specifies rows in line sequence from the uppermost row (hereafter, the rows will be referred to as a first row, a second row, . . . downward from the uppermost row), for example, from among the plurality of rows extending in the left-right direction in FIG. 9. The horizontal reading circuit 113 then issues a timing signal to the light reception unit 111 so that on the specified row, image signals are output in a point sequential manner from the λ1 pixel, the λ5 pixel, the λ3 pixel, the λ6 pixel, the λ2 pixel, the λ4 pixel, . . . , in order from a leftmost column, for example. By performing the reading operation described above repeatedly from the first row to the final row, image signals in nine colors output from the λ1 pixel, the λ2 pixel, . . . , and the λ9 pixel are read from the imaging device 110.

In the second signal readout mode, image signals are read using a combination of the pixel addition readout mode and the pixel skip readout mode. When the exposure operation is complete, the vertical scanning circuit 112 specifies the first row, a third row, and a fifth row simultaneously. The horizontal reading circuit 113 then implements addition readout in a point sequential manner on the image signals of each column on the plurality of rows specified by the vertical scanning circuit 112 in order from a left side column in FIG. 9 (hereafter, the columns will be referred to as a first column, a second column, . . . in rightward order from the left side column).

As a result, image signals from the λ1 pixel of the first row, the third row, and the fifth row, or in other words image signals from three λ1 pixels, are read from the first column. Similarly, image signals from three λ5 pixels are read in sequence from the second column, image signals from three λ3 pixels are read in sequence from the third column, and image signals from three λ6 pixels are read in sequence from the fourth column.

The second signal processor 210 then performs further processing to add the image signals subjected to addition readout in the above manner in the row direction (horizontal direction). More specifically, the image signals in the colors λ1, λ3, λ2 read from the first, third, and fifth columns are added together, and the image signals in the colors λ6, λ4, λ5 read from the fourth, sixth, and eighth columns are added together. Thereafter, the operation for adding together image signals from three consecutive odd number columns and adding together image signals from three consecutive even number columns is performed repeatedly up to the final column.

Next, the vertical scanning circuit 112 specifies a fourth row, a sixth row, and an eighth row simultaneously. The horizontal reading circuit 113 then implements addition readout in a point sequential manner on the image signals in all of the columns on the plurality of rows specified by the vertical scanning circuit 112 in order from the first column to the final column.

The second signal processor 210 then performs further processing to add the image signals subjected to addition readout in the above manner in the row direction. Accordingly, the image signals in the colors λ6, λ4, λ5 read from the first, third, and fifth columns are added together, and the image signals in the colors λ7, λ8, λ9 read from the fourth, sixth, and eighth columns are added together. Thereafter, the operation for adding together image signals from three consecutive odd number columns and adding together image signals from three consecutive even number columns is performed repeatedly up to the final column.

Thereafter, pixel addition readout from three consecutive odd number rows and pixel addition readout from three consecutive even number rows are performed repeatedly, while the second signal processor 210 performs the image signal addition processing described above.

As a result of the image signal addition readout and the addition processing implemented on the read image signals described above, image signals from nine pixels are added together. For example, an R image signal representing a rectangular region from the first row to the fifth row and the first column to the fifth column can be obtained from the first, third, and fifth columns in the first, third, and fifth rows in FIG. 9 by adding together the image signals obtained by implementing addition reading on the λ1 pixel, λ3 pixel, and λ2 pixel. Further, a G image signal representing a rectangular region extending from the first row to the fifth row and from the fourth column to the eighth column can be obtained from the fourth, sixth, and eighth columns in the first, third, and fifth rows by adding together the image signals obtained by implementing addition reading on the λ6 pixel, λ4 pixel, and λ5 pixel.

Likewise, a G image signal representing a rectangular region extending from the fourth row to the eighth row and from the first column to the fifth column can be obtained from the first, third, and fifth columns in the fourth, sixth, and eighth rows by adding together the image signals obtained by implementing addition reading on the λ6 pixel, λ4 pixel, and λ5 pixel. Also, a B image signal representing a rectangular region extending from the fourth row to the eighth row and from the fourth column to the eighth column can be obtained from the fourth, sixth, and eighth columns in the fourth, sixth, and eighth rows by adding together the image signals obtained by implementing addition reading on the λ7 pixel, λ8 pixel, and λ9 pixel.

As described above, by performing further addition processing on the image signals subjected to the addition readout, R, B, and G image signals representing rectangular regions defined by the rows subjected to the addition readout and the columns subjected to the addition processing performed by the second signal processor 210 can be obtained. At this time, as shown by the white characters in black squares in FIG. 9, when the image signals read in the second signal readout mode are processed by the second signal processor 210 in the manner described above, the resulting image signals have a similar color arrangement to image signals read from an imaging device having a Bayer array. Therefore, a conventional Bayer interpolation algorithm can be used in the demosaicing processing, leading to an improvement in the efficiency of the processing. The gamut that can be reproduced by the image signal read in the second signal readout mode is narrower than the gamut that can be reproduced by the image signal read in the first signal readout mode.

In the third and fourth embodiments, examples in which the image signals read in the second image signal readout mode include colors corresponding to the three primary colors R, G, B were described, but this invention is not limited thereto. For example, image signals in colors with which a predetermined gamut can be formed, such as colors corresponding to Y (yellow), C (cyan), and M (magenta), for example, may also be read. Further, depending on the application of the digital camera 100, image signals in two colors or one color may be read in the second signal readout mode. For example, image signals in any color from R, G, B, Y, C, M, or the like may be read as the image signal in one color. Alternatively, so-called monochrome image signals that include lightness information but not chroma information may be read as the image signal in one color. As for the image signals in two colors, image signals in combinations selected from G and B, B and R, R and G, Y and C, C and M, M and Y, and so on, for example, may be read.

-Fifth Embodiment-

Figure 11:
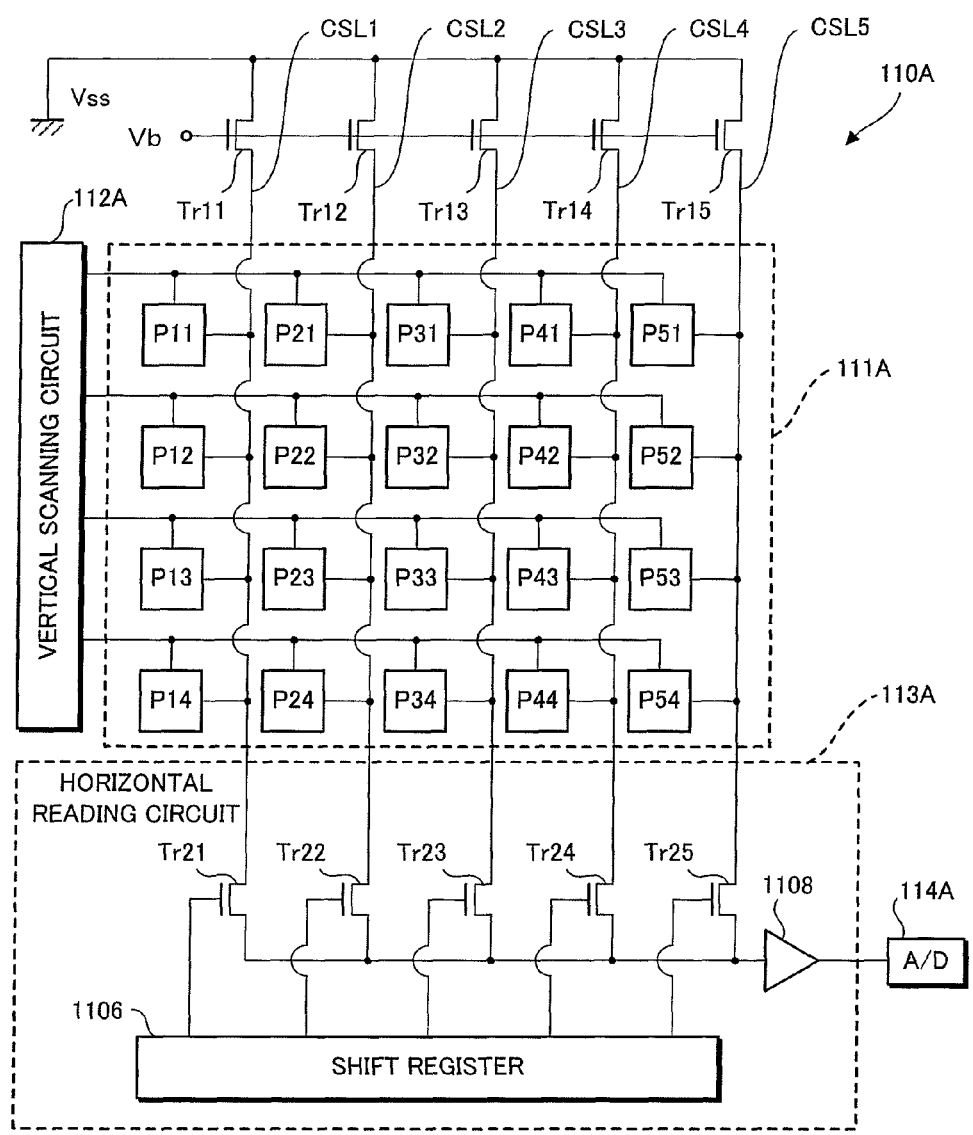
FIG. 11 is a schematic block diagram illustrating an internal constitution of a single plate imaging device provided in a digital camera according to a fifth embodiment of this invention.

A fifth embodiment of this invention will now be described with reference to FIGS. 11 to 14. FIG. 11 is a block diagram showing the schematic constitution of an imaging device 110A provided in the digital camera 100 according to the fifth embodiment of this invention. The imaging device 110A is a CMOS imaging device that is capable of exposure control using an electronic shutter. The imaging device 110A is constituted to be capable of reading image signals from respective pixels using an x-y address specification method. The imaging device 110A is also constituted to be capable of operating in either a global shutter mode or a rolling shutter mode as an operating mode of the electronic shutter.

To facilitate understanding, in FIG. 11 the imaging device 110A is depicted as having twenty pixels (P11, P21, . . . , P44, P54) constituted by four rows and five columns (five pixels in the horizontal direction and four pixels in the vertical direction). Although it is assumed in the following description that the imaging device 110A includes twenty pixels, the imaging device 110A of course includes a larger amount of pixels than that shown in FIG. 11.

The imaging device 110A includes transistors Tr11, Tr12, . . . , Tr15 composing a load current source, a light reception unit 111A, a vertical scanning circuit 112A, a horizontal reading circuit 113A, and an A/D converter 114A.

The light reception unit 111A includes the twenty pixels P11, P21, . . . , P44, P54. A color filter is provided on each pixel, and through combinations of the spectral sensitivity characteristics of the light reception unit in the respective pixels and respective spectral transmittance characteristics of the color filters, color sensors having a plurality of spectral sensitivity characteristics are formed. Control signals are output to the respective pixels from the vertical scanning circuit 112A, whereby an exposure operation, including an exposure operation using the global shutter and an exposure operation using the rolling shutter, and a signal reading operation are performed. Outputs of the pixels P11, P12, P13, P14 arranged in the column direction (vertical direction) are connected to a common signal line CSL1. Similarly, outputs of the pixels P21 to P24, outputs of the pixels P31 to P34, outputs of the pixels P41 to P44, and outputs of the pixels P51 to P54 are connected to a common signal line CSL2, a common signal line CSL3, a common signal line CSL4, and a common signal line CSL5, respectively.

The horizontal reading circuit 113A includes column selection transistors Tr21, Tr22, . . . , Tr25, a shift register 1106, and a head amplifier 1108.

One end of the common signal line CSL1 is connected to an input portion of the head amplifier 1108 via the column selection transistor Tr21, and the other end is connected to a Vss via the transistor Tr11. The other common signal lines CSL2, . . . , CSL5 are connected similarly. Gates of the column selection transistors Tr21, Tr22, . . . , Tr25 are connected to the shift register 1106. The shift register 1106 outputs selection signals to the respective gates of the column selection transistors Tr21, Tr22, . . . , Tr25 in a point sequential manner. As a result, outputs from the pixels in the selected column are input into the head amplifier 1108 in a point sequential manner, whereupon corresponding signals amplified by the head amplifier 1108 are output to the A/D converter 114A.

It is assumed that a sample hold circuit is provided in an input portion of the horizontal reading circuit 113A so that signals output from the pixels arranged on a single row are held until the horizontal reading circuit 113A finishes processing the signals of a single row.

Figure 12:
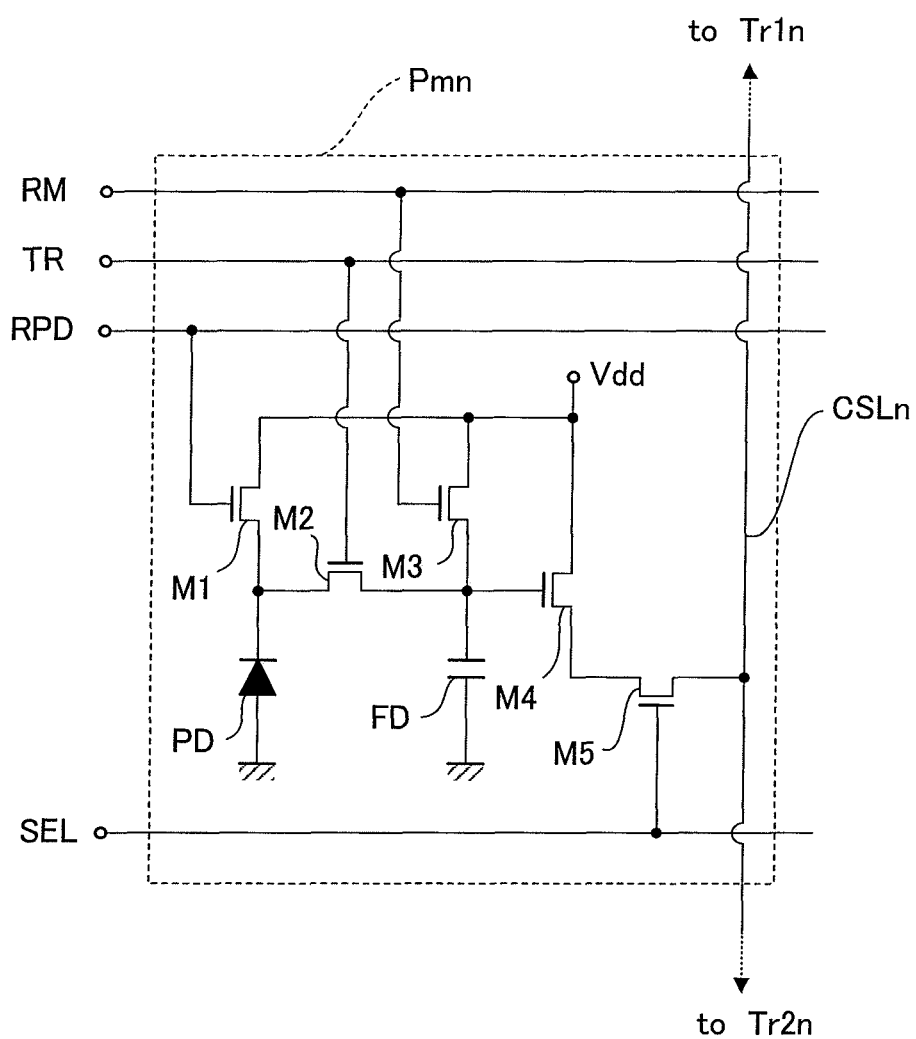
FIG. 12 is a schematic circuit diagram illustrating the internal constitution of the imaging device shown in FIG. 11 with respect to a single pixel.

FIG. 12 is a schematic circuit diagram illustrating the internal constitution of a single pixel (Pmn) disposed on an $m^{th}$ row and an $n^{th}$ column in the pixel array shown in FIG. 11. The pixel Pmn includes a photodiode PD and five transistors M1, M2, . . . , M5. FD denotes floating diffusion formed in the pixel Pmn. Hereafter, this floating diffusion will be referred to as FD.

Four signals, namely RM, TR, RPD, SEL, are input into the pixel Pmn from the vertical scanning circuit 112A. These four signals are pulse-form signals. It is assumed in the following description that the four signals are positive logic pulse signals (pulse signals in which a negative edge is generated following a positive edge).

The photodiode PD generates a charge corresponding to an amount of light incident on the pixel Pmn. One end of the transistor M1 is connected to a cathode of the photodiode PD, and the other end is connected to a Vdd. When the pulse-form RPD signal is input into a gate of the transistor M1 from the vertical scanning circuit 112A, the transistor M1 switches ON, whereby the charge stored in the photodiode PD is cleared (discharged). In other words, the RPD signal is a photodiode reset signal. When the RPD signal is input into the gate of the transistor M1, new photoelectric conversion and charge storage operations start in the photodiode PD from a negative edge generation point of the RPD signal. In other words, an exposure operation using the electronic shutter begins.

One end of the transistor M2 is connected to a connection portion between the cathode of the photodiode PD and the transistor M1, and the other end is connected to the FD. When the TR signal is input into a gate of the transistor M2 from the vertical scanning circuit 112A, the transistor M2 is switched ON such that the charge stored in the photodiode PD is led to the FD. As is evident from the above description, an exposure time of the electronic shutter is defined by a time difference between the negative edge generation timing of the RPD signal and a negative edge generation timing of the TR signal. In other words, exposure starts using the negative edge of the RPD signal as a trigger, and exposure ends using the negative edge generation timing of the TR signal as a trigger.

One end of the transistor M3 is connected to the Vdd, and the other end is connected to a connection portion between the transistor M2 and the FD. When the RM signal is input into a gate of the transistor M3 from the vertical scanning circuit 112A, the transistor M3 is switched ON such that the charge stored in the FD is cleared. At this time, a charge existing in a gate portion of the transistor M4, to be described below, is also cleared.

One end of the transistor M4 is connected to the Vdd, and the other end is connected to one end of the transistor M5. The other end of the transistor M5 is connected to a common signal line CSLn. The transistor M4 constitutes a source follower amplifier together with a transistor Trin connected to the common signal line CSLn, and outputs a signal having a potential that corresponds to the charge stored in the FD to the transistor M5. This signal is output to the common signal line CSLn when the SEL signal is input into a gate of the transistor M5 from the vertical scanning circuit 112A.

Figure 13:
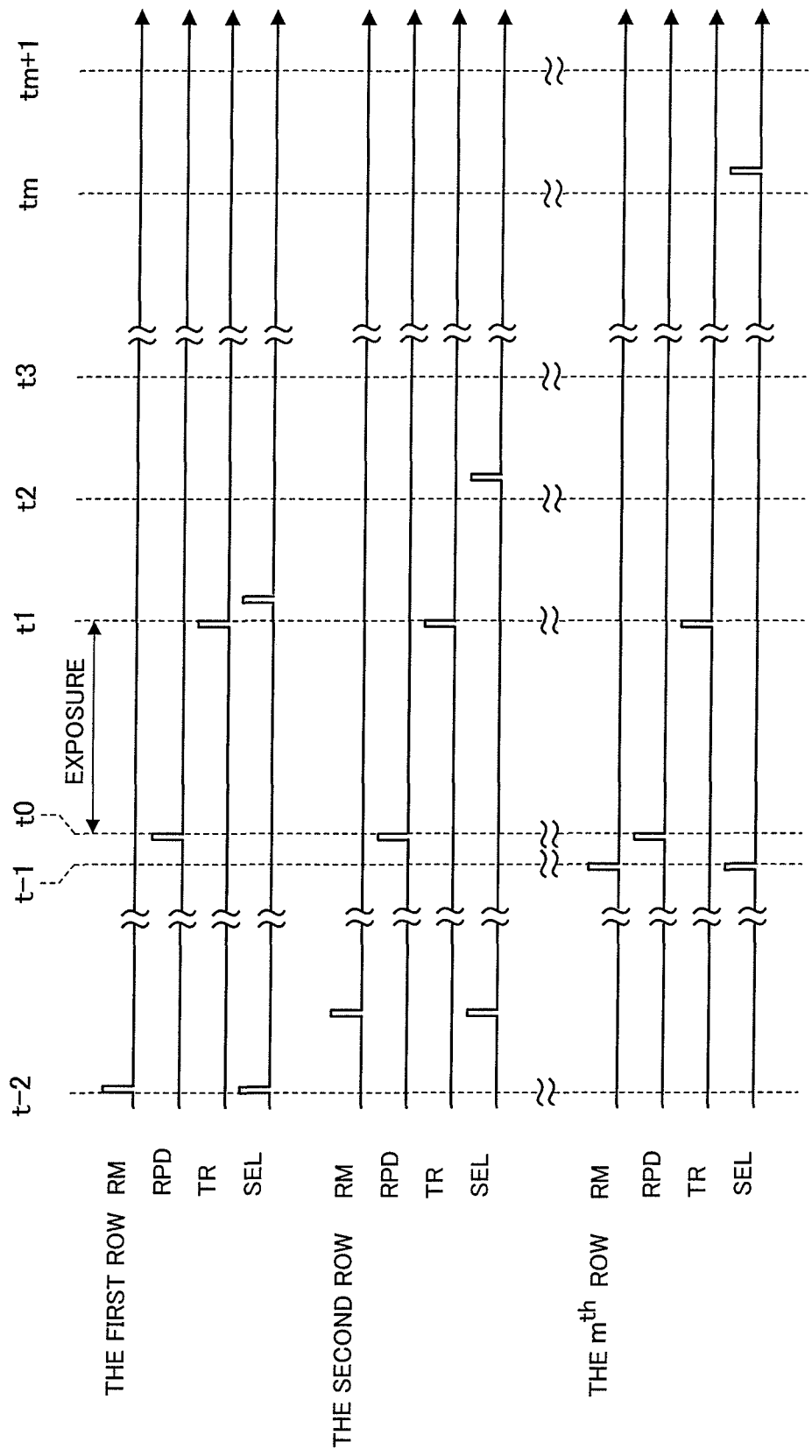
FIG. 13 is a timing chart illustrating a sequence occurring when the imaging device shown in FIG. 11 performs an exposure operation and an image signal reading operation in a global shutter mode.

FIG. 13 is a timing chart illustrating an operation performed by the imaging device 110A when the exposure operation is performed in the global shutter mode and image signal reading is performed in the first signal readout mode.

First, the RM signal and the SEL signal are input in sequence from the first row to the $m^{th}$ row. For example, when the RM signal and the SEL signal are input into the pixels P11, P21, ..., Pn1 of the first row, the charges in the FD and the gate portion of the transistor M4 in all of the pixels P11, P21, ..., Pn1 disposed on the first row are cleared. When the SEL signal is input into the gate of the transistor M5 at this time, an output signal (a reset potential) from the transistor M4 is output to the common signal lines CSL1, CSL2, ..., CSLn of the respective columns. An image signal corresponding to the reset potential is thus temporarily stored in the buffer memory 142.

The operation described above is performed from a timing t−2 to a timing t−1 in FIG. 13. In FIG. 13, an exposure operation start timing is set at t0, and earlier timings than t0 are set as t−2 (t minus 2) and t−1 (t minus 1), as noted above.

Next, the vertical scanning circuit 112A outputs the RPD signal to all of the rows in the imaging device 110A simultaneously. As a result, the charges stored in the photodiodes PD of all of the pixels are cleared.

The RPD signal output to all of the rows in the imaging device 110A falls at the timing t0, whereby the exposure operation begins in all of the pixels at once. When an exposure time set in advance in accordance with an object brightness, a set sensitivity of the digital camera 100, a set aperture value of the image pickup lens 102, and so on approaches, the vertical scanning circuit 112A outputs the TR signal to all of the rows in the imaging device 110A simultaneously. When the TR signal output to all of the rows in the imaging device 110A falls at a timing t1, transfer to the FD of the charges stored in the photodiodes of all of the pixels during the exposure operation is completed. Accordingly, the exposure operation in the global shutter mode is completed.

Thereafter, from the timing t1 to a timing t2, image signals (signal potentials of the transistor M4) are read in a point sequential manner from the pixels in all of the columns of the first row and stored temporarily in the buffer memory 142. The image signal processor 200 then performs processing (reset noise elimination processing) to subtract, for each pixel, a signal value of an image signal corresponding to the aforesaid reset potential obtained in the operation performed from the timing t−2 to the timing t−1 from a signal value of the image signal corresponding to the signal potential of the transistor M4.

Next, from the timing t2 to a timing t3, the reset noise elimination processing is performed by reading image signals from the pixels in all of the columns of the second row. The processing described above is then performed repeatedly until the image signal readout processing and reset noise elimination processing have been performed on the pixels in all of the columns in the $m^{th}$ row.

As described above, the imaging device 110A is capable of performing exposure in the global shutter mode and image signal reading in the first signal readout mode. As will be described below, the imaging device 110A is also capable of performing exposure on an arbitrary row of the imaging device 110A, for example exposure in the rolling shutter mode.

When an exposure operation is performed in the rolling shutter mode, exposure and image signal reading are performed in line sequence on an arbitrary row of the imaging device 110A. More specifically, operations for clearing the charge in the FD, exposure, and image signal readout in a point sequential manner are performed on an arbitrary row from the first row to the $m^{th}$ row in the manner described with reference to FIG. 13. At this time, the charges obtained in a previous exposure operation performed before the exposure operation in the rolling shutter mode and stored in the FDs of the other rows are not affected. The reason for this is that the operations for clearing the charge in the photodiode, resetting the FD, and transferring the charge from the photodiode to the FD can be controlled in row units.

In this embodiment, even when the featured exposure operation described above, i.e. exposure of the pixels on a specific row in the rolling shutter mode, is performed, the charges stored in the FDs of the pixels on the other rows, obtained in a previous exposure operation to the exposure operation performed in the rolling shutter mode, can be held, and making use of this characteristic, the exposure operation and image signal reading operation can be performed as follows.

In this embodiment, first, an exposure operation is performed in the global shutter mode and image signal reading is performed in the first image signal readout mode in order to record a still image. Further, in order to display a live view image on the image display 144, an exposure operation is performed in the rolling shutter mode and image signal reading is performed in the second signal readout mode.

Incidentally, when an attempt is made to read image signals from all of the pixels in the first signal readout mode following an exposure operation in the global shutter mode, the resulting amount of information is large, and therefore a considerable amount of time is required to complete image signal reading. In the meantime, the live view image displayed on the image display 144 cannot be updated. For example, when a moving object such as a child or a pet is photographed in a continuous image pickup mode in order to obtain a plurality of still images, the live view image display cannot be updated until image signal reading in the first signal readout mode is complete, and therefore the live view image freezes. As a result, a framing operation for following the object cannot be performed while viewing the live view image.

To solve this problem, the exposure operation and the image signal reading operation are performed in this embodiment in a sequence described below.

(1) An exposure operation is performed in the global shutter mode.
(2) Preferential reading is performed to read image signals preferentially in the first signal readout mode from pixels on a row determined in advance as an exposure row (line) for generating display image data.
(3) Image signal reading in the first signal readout mode from the pixels on the remaining rows not subject to the preferential reading described in the sequence (2), exposure in the rolling shutter mode using the row subjected to preferential reading in the sequence (2), image signal reading in the second signal readout mode, and live view display image data generation are repeated alternately (in a time division manner). Hereafter, the operation in the sequence (3) will be referred to as "recording image/display image alternate reading".

Figure 14:
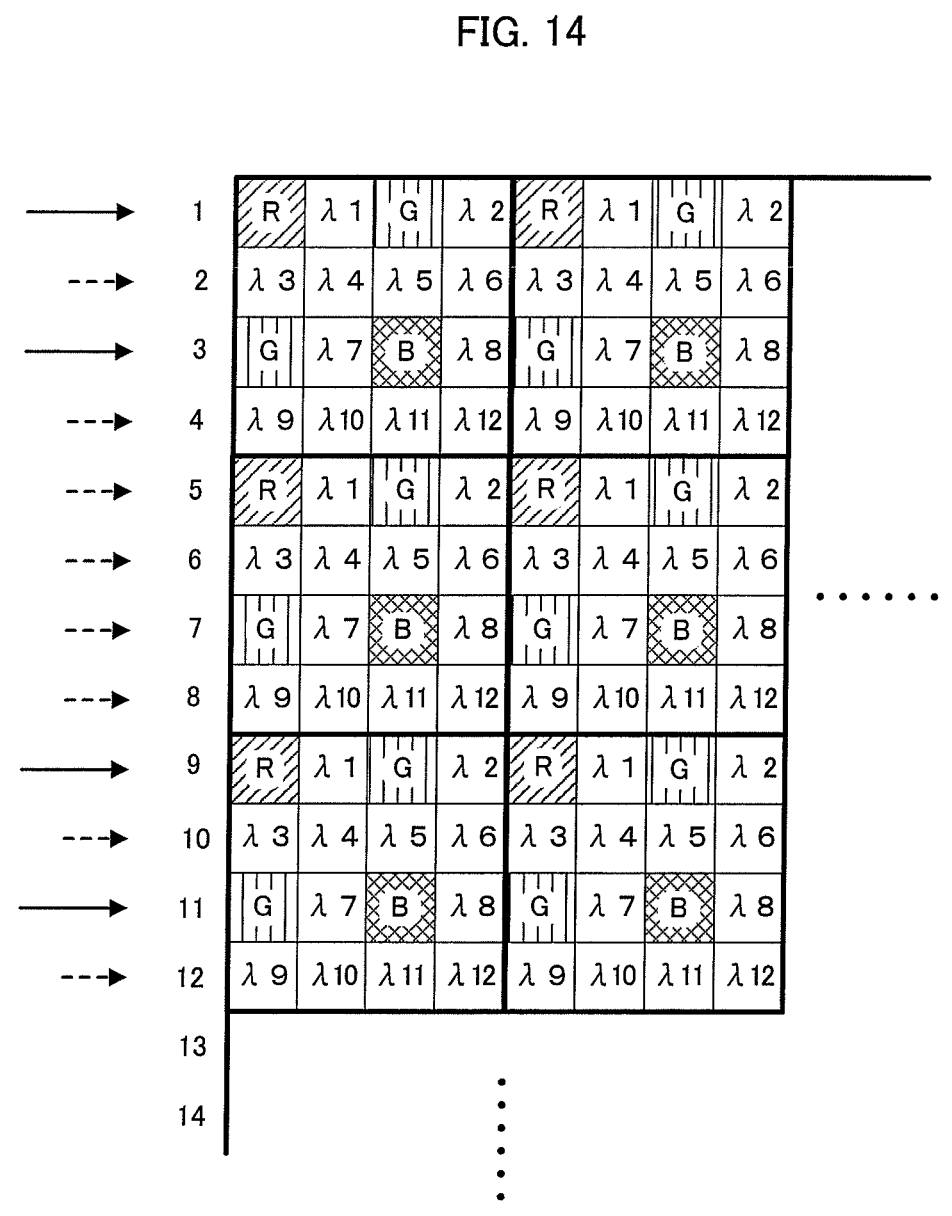

FIG. 14 is a schematic view showing an example of an array of color filters provided on photodiodes (photoelectric conversion units) arranged two-dimensionally on the light reception unit 111 of the imaging device 110A. FIG. 14 shows a regular array of color filters in R, G, B and the twelve colors $\lambda 1$ to $\lambda 12$. The number of arranged G color filters is twice that of the color filters in the other colors. A total of sixteen color filters, including $\lambda 1$ to $\lambda 12$ color filters, R and B color filters, and two G color filters, are arranged in a four row×four column square to form a single unit array. Likewise in this embodiment, spectral sensitivity characteristics determined from combinations of the respective spectral transmission characteristics of the color filters in the colors $\lambda 1, \lambda 2, \ldots , \lambda 12$, R, G, B and the spectral sensitivity characteristics of the photoelectric conversion units (photodiodes) arranged on the imaging device 110A will be referred to as the spectral sensitivity characteristic of the $\lambda 1$ pixel, the spectral sensitivity characteristic of the R pixel, and so on. It is assumed that the imaging device 110A has a pixel array of m rows and n columns.

The spectral sensitivity characteristics of the pixels may be set as shown in FIG. 8, for example. In this case, the respective spectral sensitivity characteristics of the R pixel, the G pixel, and the B pixel are set such that a combination of the spectral sensitivity characteristics of R, G, and B is capable of covering a visible light wavelength band extending from a wavelength of 380 nm to a wavelength of 780 nm. Further, respective spectral sensitivity bands of the $\lambda 1$ pixel to the $\lambda 12$ pixel exhibit spectral sensitivity characteristics in a narrower band than respective spectral sensitivity bands of the R pixel, G pixel, and B pixel. In FIG. 8, the characteristics are determined such that $\lambda 12$ is sensitive to light having a wavelength of 380 nm and $\lambda 1$ is sensitive to light having a wavelength of 780 nm. Needless to say, FIG. 8 is an example, and the spectral sensitivity characteristics of the pixels in the respective colors from $\lambda 1$ to $\lambda 12$ may be modified variously in accordance with goals.

FIG. 14 shows a partial array of pixels in an upper left corner of the imaging device 110A, wherein reference numerals 1, 2, . . . , 14 denote row numbers of the pixel array. The following description follows the aforesaid operations in the sequences (1), (2), and (3). It is assumed here that the digital camera 100 is set in a still image pickup mode, and that a live view image is displayed on the image display 144 before and after a release operation.

The exposure operation in the global shutter mode begins when a release switch of the digital camera 100 is pressed. Accordingly, the operation from the timing t−2 to the timing t−1 in FIG. 13, or in other words the FD reset operation and the operation to read the reset signal from the transistor M4, is performed. Thereafter, (1) the exposure operation in the global shutter mode, or in other words the operation from the timing t0 to the timing t1 in FIG. 13, is performed on all pixels (all rows).

Next, (2) preferential reading is performed. More specifically, image signal reading from the pixels on the first, third, ninth, eleventh, and . . . rows in FIG. 14 are read in line sequence. This preferential reading operation is performed on all rows designated as preferential reading rows from among the first row to the $m^{th}$ row of the imaging device 110A.

Next, (3) recording image/display image alternate reading is performed. The recording image/display image alternate reading operation includes the following procedures.
(3-1) Exposure in the rolling shutter mode using the rows subjected to the preferential reading in (2).
(3-2) Reading a display image signal obtained by exposure in the rolling shutter mode in the second signal readout mode.
(3-3) Reading image signals in the first signal readout mode from the pixels on the remaining rows not subjected to the preferential reading in (2).

When performing image signal reading in the second signal reading mode in (3-2), the processing time can be shortened by performing skip readout in the column direction also such that image signals are read only from pixels in odd number columns, from among the pixels in the first column to the $n^{th}$ column. In the example shown in FIG. 14, R, G, and B pixels are arranged on the odd number columns, and therefore skip readout is performed in relation to the image signals obtained from the odd number columns. However, the columns to be subjected to skip readout should be determined in accordance with the disposition of R, G, B pixels.

In FIG. 14, rows indicated by longer solid line arrows are subjected to preferential reading, and therefore the operation of (3-1) is performed on these rows. Further, rows indicated by shorter broken line arrows in FIG. 14 are not subjected to preferential reading, and therefore the operation of (3-3) is performed on the rows indicated by the shorter broken line arrows.

At this time, a sequence in which the operations of (3-1) to (3-3) are performed may take various forms, depending on the specifications of the digital camera 100 and imaging device 110A and so on.

For example, the operation of (3-3) may be performed continuously in relation to a plurality of rows, for example five rows, ten rows, or the like, and the operations of (3-1) and (3-2) may be performed alternately.

By performing the operations of (3-1) and (3-2) repeatedly, as described above, image signals from R pixels, G pixels and B pixels arranged in a Bayer array can be obtained from the image pixels read respectively in the second signal readout mode from the first, third, ninth, eleventh, . . . , $(16 \times p+1)^{th}$, $(16 \times p+3)^{th}$, $(16 \times p+9)^{th}$, and $(16 \times p+11)^{th}$ (where p is a positive integer) rows of the first to $m^{th}$ rows. It should be noted that the skip readout described with reference to FIG. 14 is merely an example of this invention, and skip readout may be implemented in various forms in accordance with the information amount required to display the live view image.

An example of an exposure operation performed using a rolling shutter method when a display image signal is to be read from the imaging device 110A was described above. However, a control signal may be issued from the vertical scanning circuit 112A so that exposure operations are performed simultaneously on the rows subjected to preferential reading in (2).

According to the fifth embodiment described above, exposure and image signal reading in the second signal readout mode are performed in order to generate live view display image data during reading of a recording image signal, which includes a comparatively large amount of information, and therefore a slowdown in updates of the live view image display can be suppressed, leading to an improvement in the operability of the digital camera. Although the gamut that can be reproduced by the image signal read in the second signal readout mode is narrower than the gamut that can be reproduced by the image signal read in the first signal readout mode, live view image display is performed without problems.

In the examples described above, the image signals read from the imaging devices 110, 110A in the second signal readout mode are used to generate live view display image data, but may be used to record a moving image. In this case, the multi-spectral image signals read in the first signal readout mode are processed for still image data recording, while the RGB image signals read in the second signal readout mode are processed for moving image data recording.

In the fifth embodiment, an example in which the image signals read in the second signal readout mode include colors corresponding to the three primary colors R, G, B was described. However, this invention is not limited thereto, and image signals in colors with which a predetermined gamut can be formed, such as colors corresponding to Y (yellow), C (cyan), M (magenta), and so on, for example, may also be read. Further, depending on the application of the digital camera 100, image signals in two colors or one color may be read in the second signal readout mode. Image signals in any color from R, G, B, Y, C, M, or the like, for example, may be read as the image signals in one color. Image signals in any combination selected from G and B, B and R, R and G, Y and C, C and M, M and Y, and so on, for example, may be read as the image signals in two colors.

Embodiments of this invention were described above, but the above embodiments merely illustrate examples of application of this invention, and the technical scope of this invention is not limited to the specific constitutions of the embodiments. This invention may be subjected to various amendments and modifications within a scope that does not depart from the spirit thereof.

This application claims priority on the basis of JP2010-184976, filed with the Japan Patent Office on Aug. 20, 2010, the entire contents of which are incorporated herein by reference

What is claimed is:

1. A digital camera comprising a multi-spectral imaging device which includes pixels that compose color sensors for four or more colors having mutually differing spectral sensitivity characteristics, and which is capable of operating in either a first signal readout mode in which an image signal including a first information amount is read in a first signal readout time or a second signal readout mode in which an image signal including a second information amount that is smaller than the first information amount is read in a second signal readout time that is shorter than the first signal readout time, wherein the multi-spectral imaging device is configured to output image signals in a number of colors corresponding to all of the four or more colors read from the pixels composing the color sensors for the four or more colors in the first signal readout mode, and output image signals in a smaller number of colors in the second signal readout mode than in the first signal readout mode, including at least signals in colors corresponding to three primary colors of R (red), G (green), and B (blue), to form a narrower gamut than a gamut that can be reproduced by the image signals output in the first signal readout mode.

2. The digital camera as defined in claim 1, wherein the multi-spectral imaging device is configured to be capable of performing pixel addition readout in the second signal readout mode, and when the image signal is read through the pixel addition readout, pixel addition is performed such that with respect to pixels composing color sensors for at least two colors, from among the pixels composing the color sensors for the four or more colors, signals output from a plurality of pixels having mutually differing spectral sensitivity characteristics are added together.

3. The digital camera as defined in claim 1, wherein the multi-spectral imaging device is configured to be capable of performing pixel addition readout in the second signal readout mode, when the image signal is read through the pixel addition readout, pixel addition is performed such that with respect to pixels composing color sensors for at least two colors, from among the pixels composing the color sensors for the four or more colors, signals output from a plurality of pixels having mutually differing spectral sensitivity characteristics are added together, and respective spectral sensitivity characteristics of the plurality of pixels and the combination of pixels to be subjected to pixel addition are set such that a spectral sensitivity characteristic obtained as a result of combining the respective spectral sensitivity characteristics of the pixels subjected to the pixel addition corresponds to the spectral sensitivity characteristic of one of the colors of R, G, B.

4. The digital camera as defined in claim 3, wherein the multi-spectral imaging device includes pixels that compose color sensors for six or more colors having mutually differing spectral sensitivity characteristics, and the respective signals in colors corresponding to the colors of R, G, B read through the pixel addition in the second signal reading mode are obtained by adding together signals output from pixels composing a plurality of color sensors having mutually differing spectral sensitivity characteristics.

5. The digital camera as defined in claim 4, wherein, when respective combinations of the plurality of pixels subjected to the pixel addition, from among the pixels composing the color sensors in the six or more colors, are assumed to be single sensor blocks and spectral sensitivity characteristics thereof are considered, sensor blocks corresponding to the colors of R, G, B are arranged such that with respect to the sensor blocks corresponding respectively to the colors of R, G, B, an arrangement pitch between sensor blocks of identical colors is substantially constant, regardless of color.

6. The digital camera as defined in claim 4, wherein, when respective combinations of the plurality of pixels subjected to pixel addition, from among the pixels composing the color sensors in the six or more colors, are assumed to be single sensor blocks and spectral sensitivity characteristics thereof are considered, the pixel array and the pixels to be subjected to the pixel addition reading are set such that an array of sensor blocks corresponding respectively to the colors of R, G, B are arranged according to the Bayer arrangement.

7. The digital camera as defined in claim 1, further comprising:
- an image display capable of displaying an image on the basis of image data generated by processing the image signal read from the multi-spectral imaging device; and
- a live view display processor that generates live view image data for performing live view display on the image display on the basis of the image signal read from the multi-spectral imaging device in the second signal readout mode.

8. The digital camera as defined in claim 1, further comprising:
- an image display capable of displaying an image on the basis of image data generated by processing the image signal read from the multi-spectral imaging device; and
- a live view display processor that generates live view image data for performing live view display on the image display on the basis of the image signal read from the multi-spectral imaging device in the second signal readout mode,
- wherein the multi-spectral imaging device is configured to be capable of operating in one exposure mode from among a one-shot exposure mode in which exposure is performed on all pixels for the same time window and an obtained signal charge is stored in a charge storage unit provided in each pixel, and a partial exposure mode in which an exposure operation is performed only on specific horizontal lines of the multi-spectral imaging device and exposure can be performed such that when the exposure operation is performed on the specific horizontal lines, signal charges stored as a result of a previous exposure operation performed on the pixels of other horizontal lines are not affected,
- exposure for the first signal readout mode is performed in the one-shot exposure mode and exposure for the second signal readout mode is performed in the partial exposure mode, and
- the image signal processor reads image signals preferentially from the pixels on the specific horizontal lines when performing image signal reading in the first signal readout mode following an exposure operation in the one-shot exposure mode, and then performs processing to read image signals corresponding to signal charges obtained in the one-shot exposure mode from the pixels on the other horizontal lines while repeatedly performing exposure in the partial exposure mode using the specific horizontal lines, image signal reading from the pixels on the specific horizontal lines, and live view display process using the live view display processor.

9. The digital camera as defined in claim 8, wherein the multi-spectral imaging device is configured to be capable of performing reading using a method of an x-y addressing when reading the image signals from the pixels in the first and second signal readout modes.

10. A digital camera comprising a multi-spectral imaging device which includes pixels that compose color sensors for four or more colors having mutually differing spectral sensitivity characteristics, and which is capable of operating in either a first signal readout mode in which an image signal including a first information amount is read in a first signal readout time or a second signal readout mode in which an image signal including a second information amount that is smaller than the first information amount is read in a second signal readout time that is shorter than the first signal readout time,
- wherein the multi-spectral imaging device is configured to be capable of outputting image signals in a number of colors corresponding to all of the four or more colors read from the pixels composing the color sensors for the four or more colors in the first signal readout mode, and outputting image signals in a smaller number of colors in the second signal readout mode than in the first signal readout mode to form a narrower gamut than a gamut that can be reproduced by the image signals output in the first signal readout mode,
- the pixels of the multi-spectral imaging device that compose the color sensors for the four or more colors include pixels that compose color sensors having spectral sensitivity characteristics corresponding to the three primary colors of R, G, B, and
- in the second signal readout mode, the multi-spectral imaging device is capable of performing skip readout such that when the image signal is read by the skip readout, signals from pixels other than the pixels that compose the color sensors having the spectral sensitivity characteristics corresponding to the colors R, G, B are skipped.

11. The digital camera as defined in claim 10, wherein, in the multi-spectral imaging device, an array of the pixels composing the color sensors and skip reading subject pixels from which image signals are to be read in the skip readout are set such that when the image signals from the skip reading subject pixels are read, a resulting array thereof conforms to the RGB Bayer arrangement.

12. The digital camera as defined in claim 10, wherein, in the multi-spectral imaging device, the pixels composing the color sensors that have the spectral sensitivity characteristics of the colors R, G, B are arranged so that with respect to skip reading subject pixels from which image signals are to be read in the skip readout, an arrangement pitch between pixels of identical colors is substantially constant, regardless of color.

* * * * *